United States Patent
Shimabukuro et al.

(10) Patent No.: US 6,823,954 B2
(45) Date of Patent: Nov. 30, 2004

(54) CONTROL SYSTEM FOR HYBRID VEHICLE

(75) Inventors: Eijiro Shimabukuro, Wako (JP); Kazuaki Takizawa, Wako (JP); Kenji Hagiwara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 89 days.

(21) Appl. No.: 10/143,941

(22) Filed: May 14, 2002

(65) Prior Publication Data

US 2002/0170758 A1 Nov. 21, 2002

(30) Foreign Application Priority Data

May 18, 2001 (JP) ........................................ 2001-148942
May 18, 2001 (JP) ........................................ 2001-148943

(51) Int. Cl.[7] .............................................. B60L 11/12
(52) U.S. Cl. .................. 180/65.2; 123/179.1; 290/40 C
(58) Field of Search .............................. 180/65.2, 65.3, 180/65.4; 477/166, 173, 181; 701/54; 123/179.1; 290/40 C

(56) References Cited

U.S. PATENT DOCUMENTS

| | | | | |
|---|---|---|---|---|
| 5,979,257 A | * | 11/1999 | Lawrie | ........................ 74/335 |
| 5,993,350 A | * | 11/1999 | Lawrie et al. | ................. 477/5 |
| 6,006,620 A | * | 12/1999 | Lawrie et al. | ................ 74/335 |
| 6,019,698 A | * | 2/2000 | Lawrie et al. | ................ 477/5 |
| 6,054,776 A | * | 4/2000 | Sumi | .......................... 290/17 |
| 6,335,573 B1 | * | 1/2002 | Eguchi et al. | ........... 290/40 C |
| 6,441,506 B2 | * | 8/2002 | Nakashima | ............... 290/40 C |

FOREIGN PATENT DOCUMENTS

JP      2000-23312      1/2000

* cited by examiner

Primary Examiner—Christopher P. Ellis
Assistant Examiner—J. Allen Shriver
(74) Attorney, Agent, or Firm—Westerman, Hattori, Daniels & Adrian, LLP

(57) ABSTRACT

In a hybrid vehicle control system equipped with an internal combustion engine (10), an electric motor (14) connected to the engine through a hydraulic clutch (12) and an automatic transmission (16) connected to the motor to be inputted with an output torque outputted from the engine and the motor to transmit the same to driven wheels (24) of the vehicle, the output torque of the motor (TM) and supply of hydraulic pressure to the clutch (PCL) is increased until the determined speed difference (dN) is less than a threshold value (dN3) and then the output torque of the engine is reduced such that the engine speed (NE) is synchronized with the motor speed (NM) when the speed difference (dN) becomes less than the predetermined value (dN3), while increasing the supply of hydraulic pressure to a line pressure equivalent value. With this, it can effectively reduces shock at clutch engagement during switchover from electric motor-powered driving to internal combustion engine-powered driving.

22 Claims, 26 Drawing Sheets

CONTROL SYSTEM FOR HYBRID VEHICLE

BACKGROUND OF THE INVENTION

1. Field of the Invention

The present invention relates to a control system for hybrid vehicle, particularly to a control system for hybrid vehicle that reduces shock at clutch engagement when switchover from electric motor-powered driving to internal combustion engine-powered driving is instructed during electric motor-powered driving.

2. Description of the Related Art

There is known a hybrid vehicle equipped with an internal combustion engine, an electric motor connected to the output shaft of the engine through a clutch, and an automatic transmission connected to the output shaft of the motor. The automatic transmission is input with the output torque of the engine or the motor, or both the engine and the motor, and transmits the torque to driven wheels at a controlled speed (gear) ratio. During driving of such a hybrid vehicle under the power of the motor, if the driver presses down on the accelerator pedal in an attempt to accelerate, for example, the clutch engages to switch the source of driving power to the engine.

If the switchover is effected simply by starting the engine and engaging the clutch, however, the addition of the engine output torque to the motor output torque produces a sudden increase of the vehicle drive torque that may impart a shock to the passengers.

Japanese Laid-open Patent Application No. 2000-23312 teaches a technique for reducing this shock by providing a second motor to handle engine starting and using the second motor to absorb the output torque of the engine while the engine speed is being adjusted to match the motor speed.

More specifically, the method employed by this prior art technique is to detect the output torque of the second motor while it is absorbing the output torque of the engine, estimate the engine output torque, and adjust the desired torque of the motor connected to the automatic transmission based on the difference between the detected torque and the estimated torque.

Owing to the difficulty of accurately estimating the output torque of the engine, however, this known technology cannot always realize adequate shock absorption. As the torque transfer behavior of the clutch is hard to predict, moreover, this prior art technique is also less than satisfactory in control response to instantaneous torque changes.

SUMMARY OF THE INVENTION

A first object of the present invention is therefore to overcome these problems by providing a control system for hybrid vehicle equipped with an internal combustion engine, an electric motor connected to the output shaft of the engine through a clutch, and an automatic transmission connected to the output shaft of the motor that is input with the output torque of the engine or the motor, and transmits the torque to driven wheels, which can effectively reduce shock at clutch engagement during switchover from electric motor-powered driving to internal combustion engine-powered driving, when an instruction to switch to vehicle driving powered by the engine is made in a course of vehicle driving powered by the motor.

A second object of the present invention is, more specifically, to provide the system mentioned above which can effectively reduce the shock at clutch engagement during switchover from electric motor-powered driving to internal combustion engine-powered driving, when an instruction to switch to vehicle driving powered by the engine is indicated, for example, by the vehicle driver as an indication to accelerate in a course of vehicle driving powered by the motor.

The present invention achieves these objects by providing a system for controlling a hybrid vehicle equipped with an internal combustion engine, an electric motor connected to an output shaft of the engine through a hydraulic clutch and an automatic transmission connected to an output shaft of the motor to be inputted with an output torque outputted from at least one of the engine and the motor to transmit the output torque to driven wheels of the vehicle, comprising: initial control conducting means for conducting an initial control to supply priming hydraulic pressure to the clutch to take up dead stroke and to start the engine, when an instruction to switch to vehicle driving powered by the engine is made in a course of vehicle driving powered by the motor; speed difference determining means for determining a speed difference between speeds of the motor and the engine; increase control conducting means for conducting an increase control to increase the output torque of the motor and to increase supply of hydraulic pressure to the clutch based on the determined speed difference, when the engine is started; synchronous control conducting means for conducting a synchronous control to reduce the output torque of the engine for a predetermined period of time such that the engine speed is synchronized with the motor speed when the speed difference becomes less than a predetermined threshold value.

BRIEF DESCRIPTION OF THE DRAWINGS

These and other objects and advantages of the present invention will be more apparent from the following description and drawings, in which.

DETAILED DESCRIPTION OF THE PREFERRED EMBODIMENTS

A control system for hybrid vehicle according to an embodiment of the present invention will now be explained with reference to the attached drawings.

Figure 1:
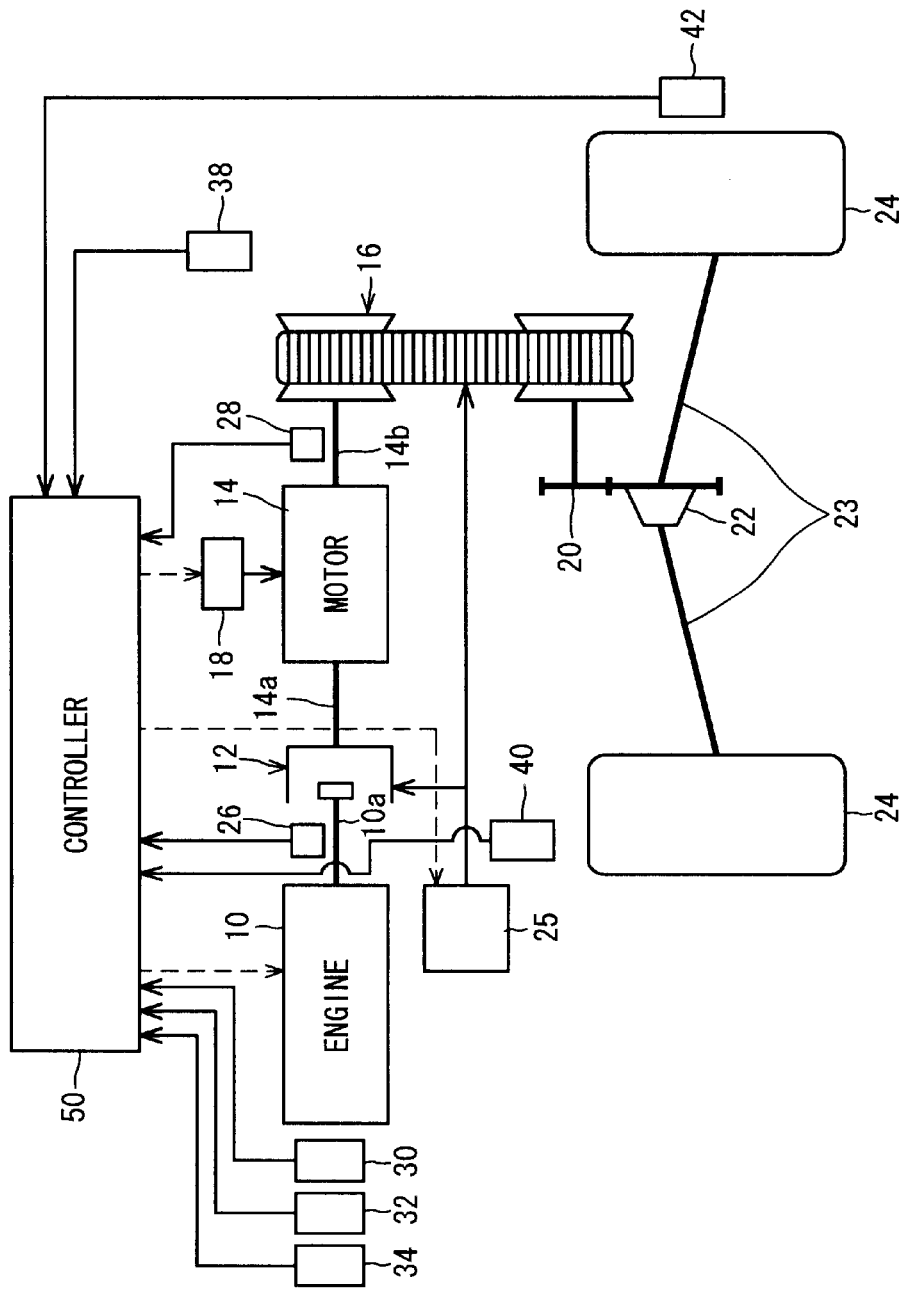
FIG. 1 is a schematic view showing the overall configuration of the control system for hybrid vehicle according to a first embodiment of the present invention.

FIG. 1 is a schematic view showing the overall configuration of the control system for hybrid vehicle.

As shown in this figure, the system comprises a four-cylinder, spark-ignition internal combustion engine 10, an electric motor 14 whose input shaft 14a is connected to an output shaft 10a of the engine 10 through a hydraulic clutch 12, and an automatic transmission 16 connected to an output shaft 14b of the motor 14.

The engine 10 is an OHC in-line four-cylinder engine. A fuel injector (not shown) is installed at each cylinder in the vicinity of an intake valve (not shown) connected to an intake pipe (not shown) through an intake manifold (not shown). Fuel injected from the fuel injector is mixed with air sucked in through the intake pipe and the resulting air-fuel mixture is drawn into the associated cylinder. When the engine 10 is started, the air-fuel mixture drawn into the cylinders is ignited and the resulting explosive combustion drives down pistons (not shown) to rotate a crankshaft (not shown). The rotation of the crankshaft is transmitted to the outside through the output shaft 10a.

Figure 2:
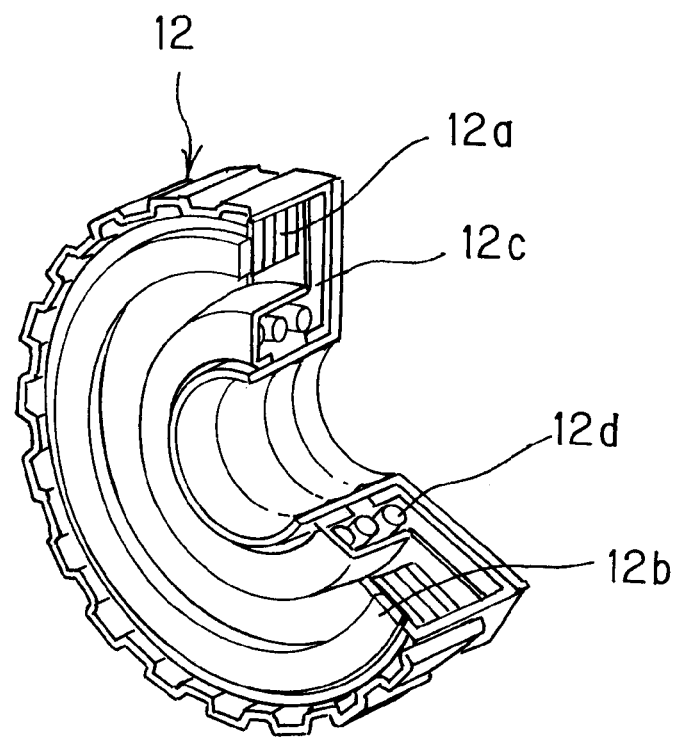
FIG. 2 is a perspective view showing the hydraulic clutch illustrated in FIG. 1.

As shown in FIG. 2, the hydraulic clutch 12 is a multiple disk hydraulic clutch comprising a plurality of alternately arranged clutch disks 12a and clutch plates 12b. Reference symbol 12c designates a hydraulic chamber and reference symbol 12d a return spring. When the hydraulic clutch 12 is hydraulically actuated by introduction of pressurized operating fluid (Automatic Transmission Fluid), the clutch disks 12a are forced onto the clutch plates 12b to connect the output shaft 10a of the engine 10 directly with the input shaft 14a of the motor 14.

The motor 14 is a DC brushless generator-motor connected to a battery (not shown) through a motor current supply circuit 18. It operates as an electric motor when supplied with current. When driven by the engine 10 with the supply of current stopped, it operates as a generator that charges the battery.

As shown in FIG. 1, the automatic transmission 16 is a belt-drive Continuously Variable Transmission (CVT) connected to wheels 24 through a final gear 20, a differential 22 and drive shafts 23. The automatic transmission 16 receives the output torque of one or both of the engine 10 and motor 14 as input, changes the speed of the input torque at a ratio (gear ratio) determined by the hydraulic pressure supplied through a hydraulic unit 25, and drives the wheels 24 to propel the vehicle (not shown). Hydraulic pressure to the hydraulic clutch 12 is also supplied through the hydraulic unit 25.

A first rpm sensor 26 is installed near the output shaft 10a of the engine 10 at a point upstream of the hydraulic clutch 12 and outputs a signal proportional to the speed NE of the engine 10 (clutch input speed). A second rpm sensor 28 is installed near the output shaft 14b of the motor 14 at a point of upstream of the connection with the automatic transmission 16 and outputs a signal proportional to the speed NM of the motor 14 (transmission input speed).

A throttle position sensor 30 is installed near a throttle valve (not shown) of the engine 10 and outputs a signal indicative of the throttle opening TH. A coolant temperature sensor 32 is installed near a coolant passage (not shown) of the engine 10 and outputs a temperature indicative of the coolant temperature TW. An intake air temperature sensor 34 is installed at an appropriate part of the intake pipe (not shown) and outputs a signal proportional to the intake air temperature TA.

An accelerator position sensor 38 is installed near the accelerator pedal (not shown) located on the vehicle floor in the vicinity of the driver's seat and outputs a signal indicative of the amount of accelerator depression (position of accelerator) AP by the driver. The accelerator pedal is not mechanically linked with the throttle valve and the throttle valve is operated through a pulse motor (or other such actuator) in response to the position of the accelerator pedal in a so-called "Drive By Wire" fashion.

A temperature sensor 40 is installed near the hydraulic unit 25 of the automatic transmission 16 and outputs a signal proportional to the temperature TATF of the operating fluid ATF. A vehicle speed sensor 42 is installed near a drive shaft 23 and outputs a signal proportional to the vehicle travel speed (vehicle speed) V.

The outputs of these sensors are sent to a controller 50. The controller 50 comprises a microcomputer. It uses the sensor outputs to determine the engine speed and the like and calculates the output torque of the motor 14 from the applied current command value sent to the motor current supply circuit 18 of the motor 14.

Figure 3:
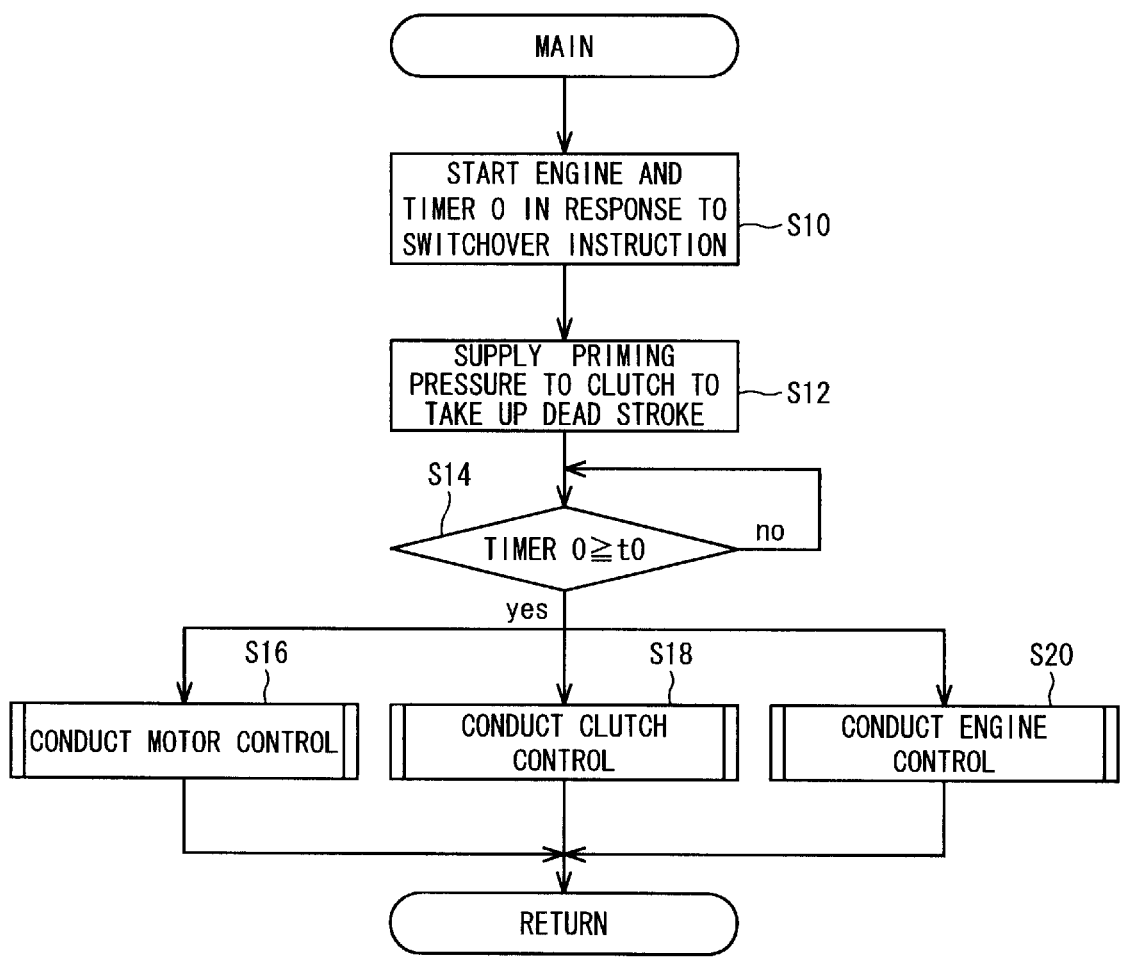
FIG. 3 is a flow chart showing the operation of the control system for hybrid vehicle according to the first embodiment.

FIG. 3 is a flow chart showing the operation of the control system for hybrid vehicle according to this embodiment.

The explanation of this flow chart will be preceded by some background information regarding the operation of the system of this embodiment.

The operation according to the flow chart of FIG. 3 is conducted in the course of vehicle driving powered by the motor 14 when an instruction to switch to driving powered by the engine 10 occurs, for example, in response to the driver's having indicated an intention to accelerate by depressing the accelerator pedal (indicating a power-on-downshifting (i.e., the so-called "kickdown (KD)")".

Figure 4:
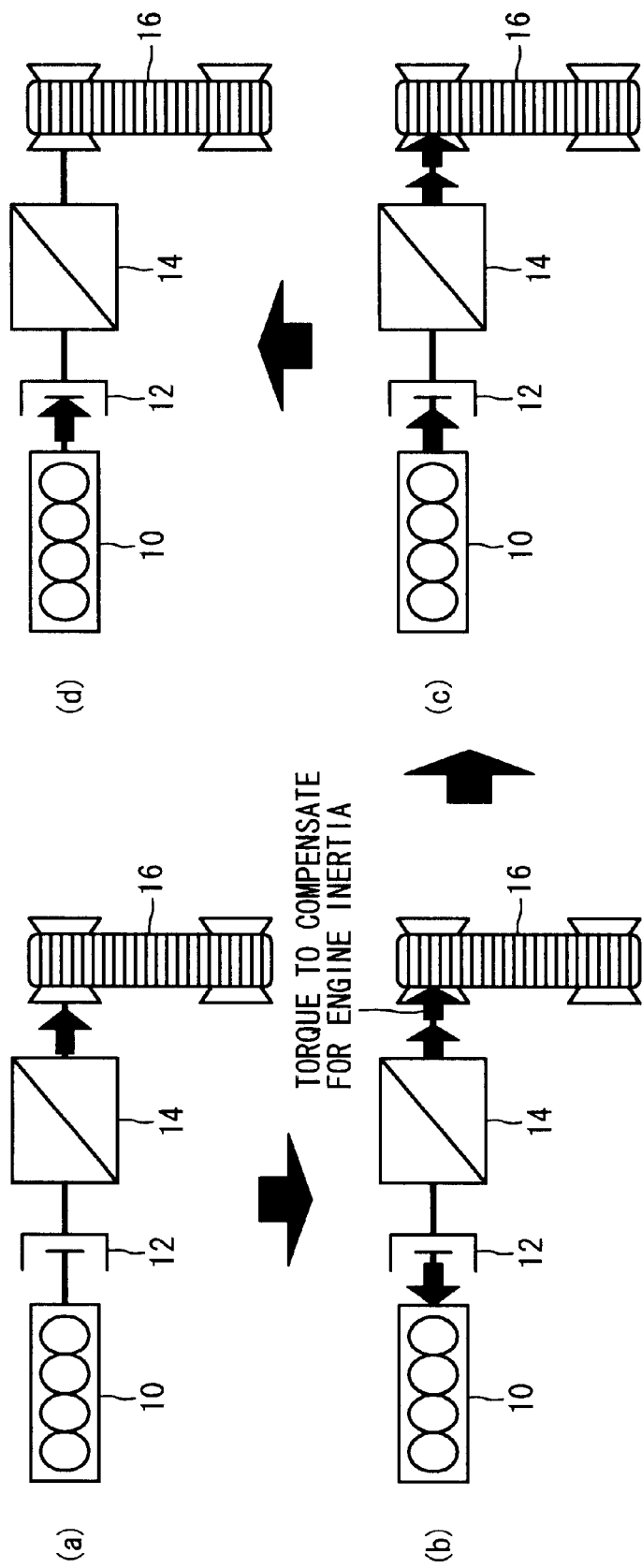
FIG. 4 is a set of diagrams explaining torque transmission at the time of switchover in the system illustrated in FIG. 1.

FIG. 4 is a set of diagrams for explaining torque transmission at the time of switchover. During driving powered by the motor 14, the output torque of the motor 14 is input to the automatic transmission 16 as shown in (a) of FIG. 4. When an instruction to switch to engine driving occurs, the motor 14 helps to start the engine 10 as shown in (b) of FIG. 4.

As shown in (c) of FIG. 4, once starting of the engine 10 has been completed, the output torque of the engine 10 and the output torque of the motor 14 are both input to the automatic transmission 16. Then, as shown in (d) of FIG. 4, after engagement of the hydraulic clutch 12 has been completed, only the output torque of the engine 10 is input to the automatic transmission 16 through the output shaft of the motor 14.

Figure 5:
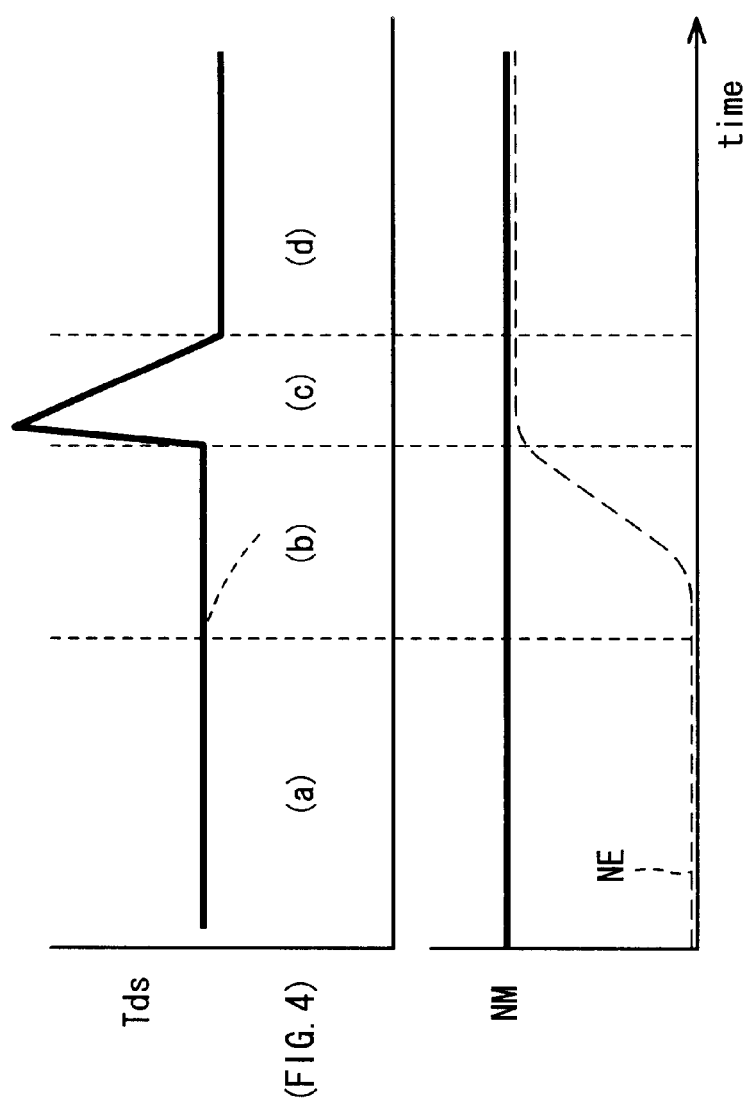
FIG. 5 is a time chart similarly explaining torque transmission at the time of switchover in the system illustrated in FIG. 1.

The changes in engine speed NE (and motor speed NM) and drive shaft torque Tds during the motor-assisted states illustrated in (a) to (d) of FIG. 4 are shown in a time chart of FIG. 5.

During engine starting, the drive shaft torque Tds will decrease as indicated by the broken line Tds in FIG. 5 unless the output torque of the motor 14 is increased to compensate for the inertia of the engine 10. As shown in FIG. 5, upon full engagement of the hydraulic clutch 12, the drive shaft torque Tds changes abruptly by an amount equal to the inertial compensation torque produced by the motor 14. As pointed out earlier, this may impart a shock to the passengers.

Figure 6:
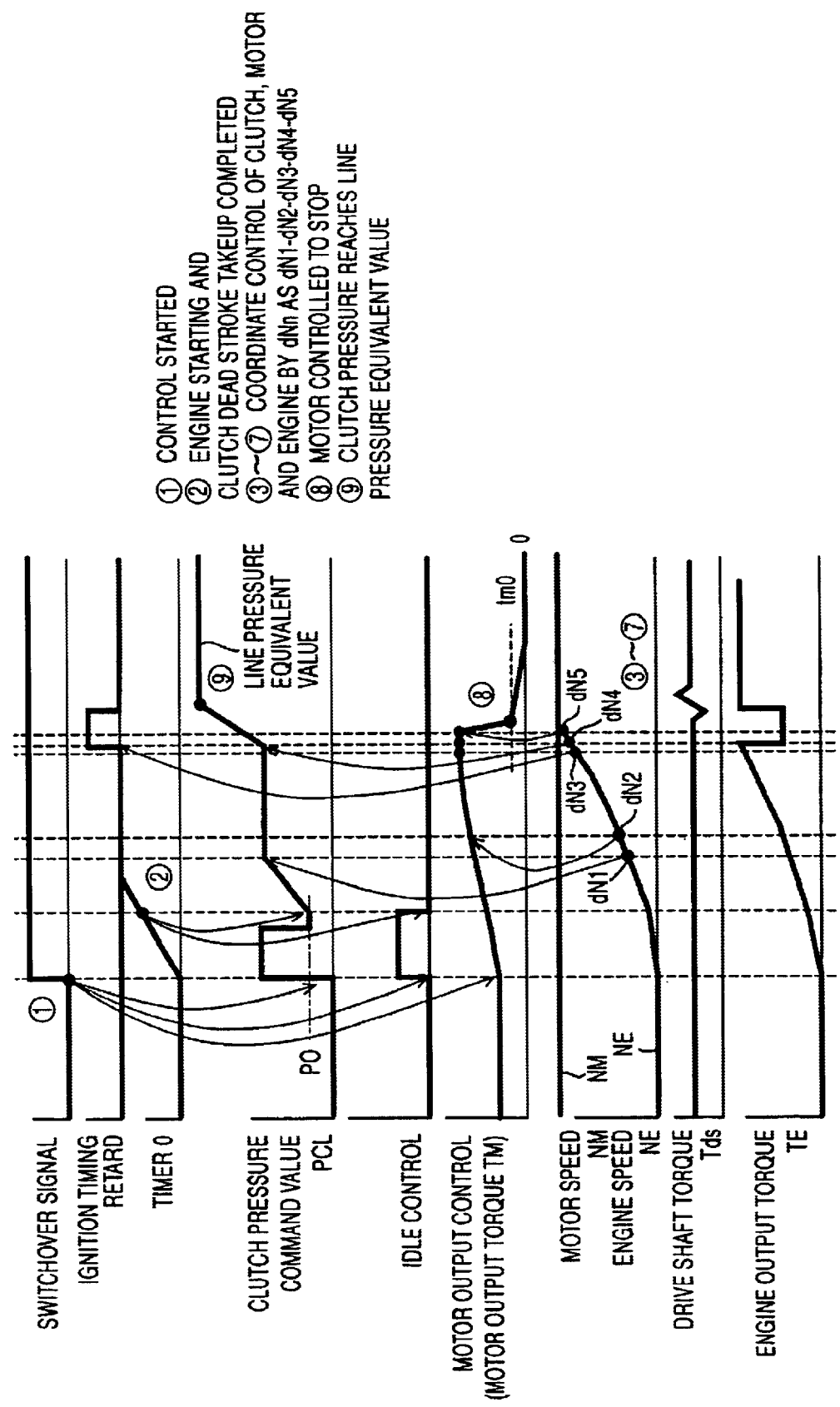
FIG. 6 is a time chart also showing the operation of the system according to the first embodiment.

The system of this embodiment is therefore configured to conduct the coordinated control of the motor 14, hydraulic clutch 12 and engine 10 illustrated in FIG. 6, so as to reduce the shock to the passengers. It also offers a secondary advantage of lowering the load on the hydraulic clutch 12 by reducing output shaft torque fluctuation.

The operation of the system of this embodiment will now be explained with reference to the flow chart of FIG. 3 and a time chart of FIG. 6.

The program begins in S10 in which a decision to start the engine 10 is made in response to the aforesaid switchover instruction.

Specifically, as shown in FIG. 6, during driving powered by the motor 14, a change per unit time occurring in the output of the accelerator position sensor 38 (indicative of the accelerator position AP) that is equal to or greater than a predetermined value is interpreted as indicating the driver's intention to accelerate. In response thereto, as shown at the top of FIG. 6, a switchover signal (instruction) for switching the source of driving power from the motor 14 to the engine 10 is produced. The system responds to the switchover signal by initiating the starting of the engine 10 and starting a timer 0 (up-counter) for measuring or clocking elapsed time.

The program then proceeds in S12 in which the hydraulic clutch 12 is supplied with priming pressure (hydraulic pressure supply). Specifically, as indicated by the clutch pressure command value in FIG. 6, supply of current to a magnetic solenoid (not shown) is started to supply hydraulic pressure to the hydraulic clutch 12 in accordance with the illustrated characteristic.

Figure 7:
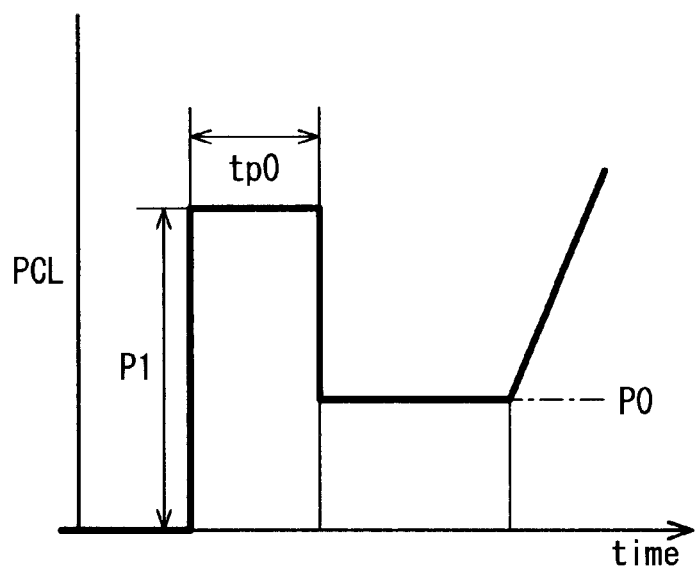
FIG. 7 is a time chart showing the command for achieving this supply of priming pressure, referred to in the flow chart of FIG. 3.

As shown in FIG. 7, the command for achieving this supply of priming pressure, which amounts to so-called dead stroke takeup is implemented by controlling the current supplied to the magnetic solenoid such that the pressure maintains a predetermined height P1 for a predetermined time period tp0.

Figure 8:
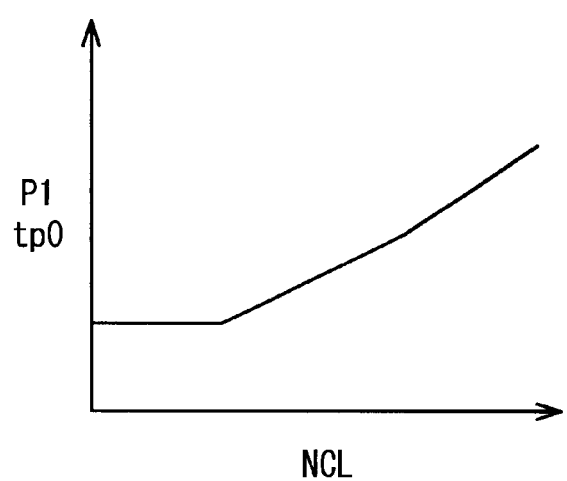
FIG. 8 is a graph explaining the characteristic of height P1 shown in FIG. 7 set relative to the clutch rotation speed NCL.
Figure 9:
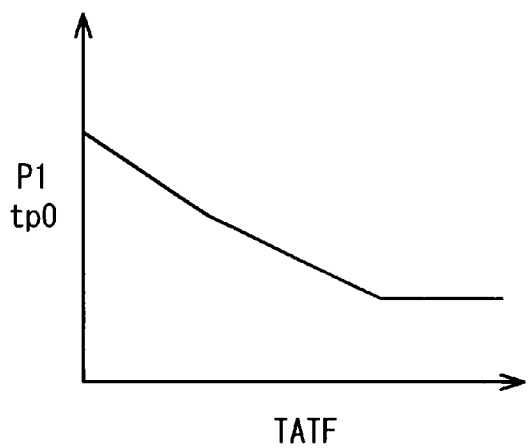
FIG. 9 is a graph explaining the characteristic of the predetermined time period tp0 shown in FIG. 7 set relative to the temperature TATF of operating oil (ATF)

The predetermined time period tp0 and height P1 are parameters related to the viscosity of the operating fluid ATF. They are determined based on the clutch rotational speed (rotational speed of the hydraulic clutch 12 detected based on the output of the first rpm sensor 26) NCL (or the temperature TATF of the operating fluid ATF) to optimize the dead stroke takeup and improve the responsivity of the hydraulic clutch 12 in accordance with the characteristics shown in FIGS. 8 and 9.

Figure 10:
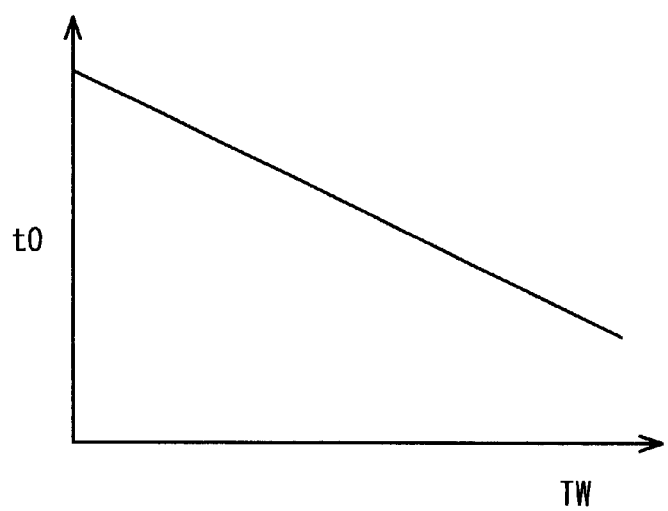
FIG. 10 is a graph showing the predetermined time period t0 indicative of a dead time period suitably set with reference to the engine cranking characteristic and referred to in the flow chart of FIG. 3.

The program then proceeds in S14 in which it waits until the value of the timer 0 exceeds a predetermined time period t0. The predetermined time period t0 is a dead time period suitably set with reference to the engine cranking characteristic. As shown in FIG. 10, it is defined or set to decrease with warm-up of the engine 10 determined from rise in the coolant temperature TW. The temperature TATF of the operating fluid ATF can be used as a measure of engine warm-up instead of the coolant temperature TW.

When passage of the predetermined time period t0 is confirmed in S14, it is determined that the engine 10 has started with assistance from the motor 14, and control of the motor 14, hydraulic clutch 12 and engine 10 is respectively conducted in S16, S18 and S20.

While only a single flow chart is shown for simplicity of explanation, the processing in S16 to S20 is actually executed simultaneously (synchronously) in accordance with separate parallel routines. Control of the automatic transmission 16 is also conducted but is not explained here because the control is not directly related to the substance of the present invention.

Figure 11:
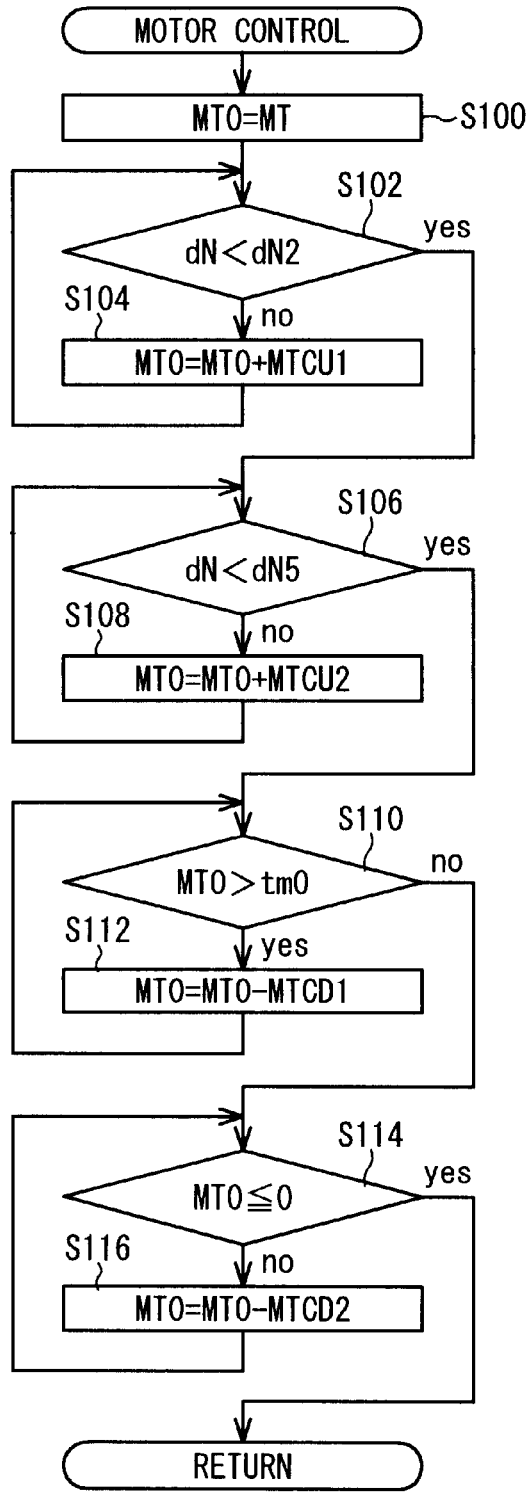
FIG. 11 is a subroutine flow chart showing the operation for controlling the motor referred to in the flow chart of FIG. 3.

FIG. 11 is a subroutine flow chart showing the operation for controlling the motor 14.

The program proceeds in S100 in which the applied current command value MT corresponding to the current torque of the motor 14 is defined as a motor torque command value MT0. In other words, the motor torque command value is calculated as the applied current command value being sent to the motor current supply circuit 18. Thus the processing in this step amounts to using the applied current command value to calculate an estimated torque equivalent value representing the estimated output torque of the motor 14 and defining this value as the motor torque command value.

When the result in S102 is NO, the program proceeds to S104 in which the motor torque command value MT0 is upwardly corrected (increased) by adding an addition term MTCU1, and then returns to S102. The processing in S102 and S104 is repeated until the result in S102 becomes YES. In other words, as shown in the time chart of FIG. 6, the motor output torque is increased at a fixed rate until dN becomes less than dN2 (i.e., until the engine speed NE rises by an equivalent amount).

When the result in S102 is YES, the program proceeds to S106 in which it is checked whether the speed difference dN is less than a second threshold value dN5 (e.g., 50 rpm). When the result is NO, the program proceeds to S108 in which the motor torque command value MT0 is upwardly corrected (increased) by adding a second addition term MTCU2, and then returns to S106. The processing in S106 and S108 is repeated until the result in S106 becomes YES.

Therefore, as shown in the time chart of FIG. 6, after dN falls below dN2, the motor output torque TM is again increased at a fixed rate until dN becomes smaller than dN5 (i.e., until the engine speed NE rises by an equivalent amount). The second addition term MTCU2 is set smaller than the addition term MTCU1, and the motor output torque TM is controlled such that the rate of increase after dN becomes smaller than dN5 is smaller than the rate of increase up to the time that it became smaller than dN5. This is because absorption of the inertia of the engine 10 is completed at the time point when dN becomes smaller than dN5.

When the result in S106 becomes YES, the program proceeds to S110 in which it is checked whether the motor torque command value MT0 exceeds a third threshold value tm0 (shown in FIG. 6). When the result is YES, the program proceeds to S112 in which the motor torque command value is downwardly corrected by subtracting a subtraction term MTCD1 from the motor torque command value MT0, and then returns to S110. The processing in S110 and S112 is repeated until the result in S110 becomes NO.

The absolute value of subtraction term MTCD1 is set much larger than the absolute value of the addition term MTCU1 (and the absolute value of the second addition term MTCU2) such that, as shown in the time chart of FIG. 6, the motor output torque TM falls sharply at a fixed rate from the time that dN becomes smaller than dN5 to the time that it becomes smaller than the threshold value tm0.

When the result in S110 becomes NO, the program proceeds to S114 in which it is checked whether the motor torque command value MT0 is less than or equal to 0 (shown in FIG. 6). When the result in S114 is YES, the subroutine program is immediately terminated. When the result is NO, the program proceeds to S116 in which the motor torque command value MT0 is downwardly corrected (decreased) by subtracting a second subtraction term MTCD2, and then returns to S114. The processing in S114 and S116 is repeated until the result in S114 becomes YES.

In a manner analogous to that in the case of addition, the second subtraction term MTCD2 is set much smaller than the second subtraction term MTCD1, and the motor output torque TM is controlled such that the rate of decrease after MT0 becomes smaller than tm0 is very much smaller than the rate of decrease up to the time that it becomes smaller than tm0 (i.e., so that the rate of decrease becomes gradual).

The clutch control will now be explained.

Figure 12:
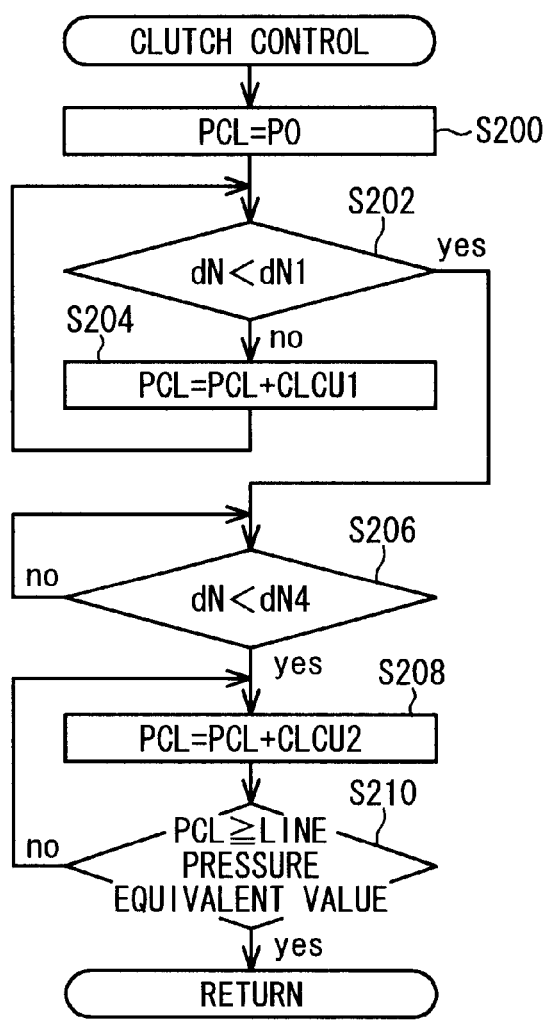
FIG. 12 is a subroutine flow chart showing the operation for controlling the hydraulic clutch referred to in the flow chart of FIG. 3.

FIG. 12 is a subroutine flow chart showing the operation for controlling the hydraulic clutch 12. At the time the subroutine of FIG. 12 is activated, the hydraulic clutch 12 has already been supplied with priming pressure by the operation conducted in S12 of the flow chart of FIG. 3 explained earlier.

The program begins in S200 in which the clutch pressure command value PCL (command value defined by the amount of current being supplied to the magnetic solenoid of the hydraulic clutch 12) is defined as a value P0. In a manner analogous to what was explained regarding the motor torque command value, the clutch pressure command value is calculated as a command value defining the amount of current applied to the magnetic solenoid.

The value P0 represents the initially set load equivalent pressure of the return spring 12d of the hydraulic clutch 12 and is calculated as:

$$P0 = FRTN/APST$$

where FRTN is the load of the return spring 12d and APST is the piston area of the hydraulic clutch 12.

The program then proceeds in S202 in which it is checked whether the speed difference dN is less than a fourth threshold value dN1 (e.g., 1200 rpm). When the result is NO, the program proceeds to S204 in which the clutch pressure command value PCL is upwardly corrected (increased) by adding an addition term CLCU1, and returns to S202. The processing in S202 and S204 is repeated until the result in S202 becomes YES. In other words, as shown in FIG. 6, the hydraulic pressure supplied to the clutch is increased at a fixed rate until dN becomes smaller than dN1.

When the result in S202 is YES, the program proceeds to S206 in which it is checked whether the speed difference dN is less than a fifth threshold value dN4 (e.g., 100 rpm). The program loops while waiting for the result to become YES, whereupon the program proceeds to S208 in which the clutch pressure command value PCL is upwardly corrected (increased) by adding a second addition term CLCU2.

Therefore, as shown in the time chart of FIG. 6, after dN falls below dN1, the clutch pressure command value PCL is held at constant value until dN becomes smaller than dN4. After dN becomes smaller than dN4, the hydraulic pressure supplied to the clutch again increases at a constant rate. The second addition term CLCU2 is set larger than the addition term CLCU1, and the hydraulic pressure supplied to the clutch is controlled such that the rate of increase after dN becomes smaller than dN4 is greater than the rate of increase up to the time that it becomes smaller than dN4 (i.e. so that the rate of increase becomes rapid).

The program then proceeds in S210 in which it is checked whether the clutch pressure command value PCL is equal to or greater than the line pressure equivalent value (shown in FIG. 6). When the result is YES, the subroutine program is immediately terminated. When the result is NO, the program returns to S208, whereafter the processing in S208 and S210 is repeated until the result in S210 becomes YES.

In this manner, upward (increase) control of the hydraulic pressure supplied to the hydraulic clutch 12 (clutch pressure command value) and upward/downward (increase/decrease) control of the output torque of the motor 14 (motor torque command value) are conducted synchronously with decrease in the detected speed difference (rise in engine speed NE).

More specifically, the detected speed difference dN (difference obtained by subtracting engine speed NE from motor speed NM, which is a value indirectly indicating the engine speed when the motor speed NM is kept constant) is successively compared with a series of threshold values dNn.

Each time the detected speed difference becomes smaller than one of the threshold values (i.e., each time the engine speed NE rises by an equivalent amount), the hydraulic pressure supplied to the hydraulic clutch 12 (clutch pressure command value) is upwardly controlled and the motor output torque TM of the motor 14 (motor torque command value MT0) is upwardly/downwardly controlled.

The engine control will now be explained.

Figure 13:
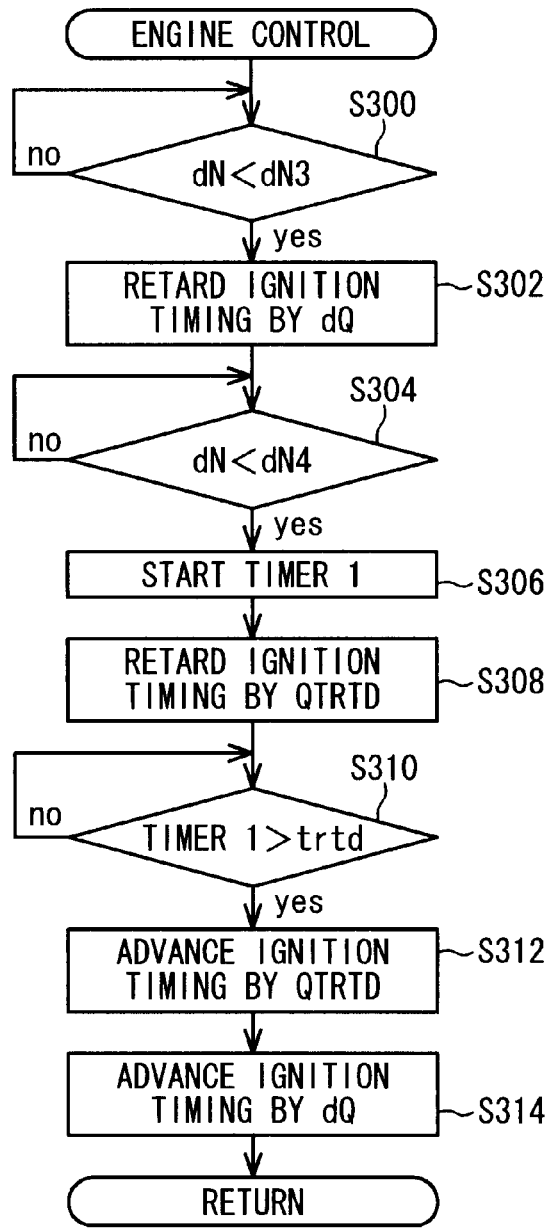
FIG. 13 is a subroutine flow chart showing the operation for controlling the engine referred to in the flow chart of FIG. 3.

FIG. 13 is a subroutine flow chart showing the operation for controlling the engine 10.

Although omitted from the drawings, the engine 10 is cranked and started by rotation transmitted from the motor 14 immediately after the dead stroke of the hydraulic clutch 12 has been taken up by supply of priming pressure.

The program begins in S300 in which the program waits until the speed difference dN is less than a sixth threshold value dN3 (e.g., 150 rpm).

Figure 14:
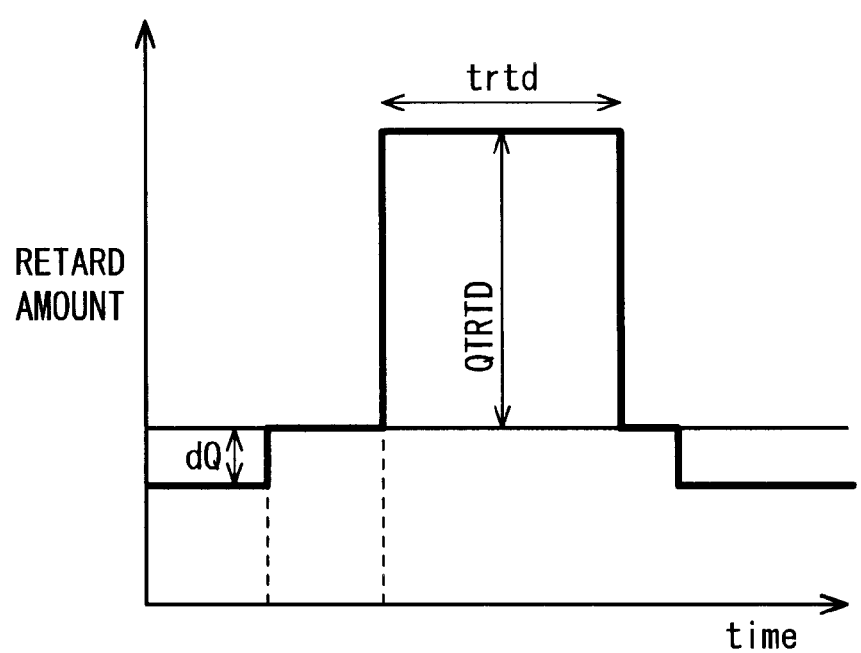
FIG. 14 is a graph showing the amount of ignition timing retardation referred to in the flow chart of FIG. 13.

Upon confirmation that dN has become smaller than dN3 in S300, the program proceeds to S302 in which the ignition timing is retarded by a small amount (small crank angular value) dQ. This retarding of the ignition timing is carried out as being in line with the purpose of the engine control, which is to temporarily reduce the output torque of the engine 10. In order to avoid an abrupt change in the engine output at this time, the ignition timing retardation conducted at the time the speed difference dN becomes smaller than dN3 is, as shown in FIG. 14, set to a small amount compared with a retard amount QTRTD explained later.

The program then proceeds in S304 in which the program waits for the speed difference dN to become smaller than a fifth threshold value dN4, which is set to be near the sixth threshold value and upon confirming that dN has become smaller than dN4, proceeds to S306 in which a timer 1 (up-counter) is started for measuring or clocking elapsed time, and to S308 in which the ignition timing is retarded by a predetermined large amount (crank angle) QTRTD.

The program then proceeds in S310 in which it is checked whether the value of the timer 1 has exceeded a predetermined value (time) trtd (shown in FIG. 14) and the predetermined retard amount is maintained until the result becomes YES. This markedly decreases the output torque of the engine 10. The retard amounts dQ and QTRTD and the time trtd are set at values matched to the contemplated reduction in engine output. A crank angular value can be used in place of time trtd.

When the result in S310 becomes YES, the program proceeds to S312 in which the ignition timing is returned in the advance direction by an amount equal to the retard amount QTRTD, and then to S314 in which the ignition timing is returned in the advance direction by an amount equal to the small amount dQ, whereafter the program is terminated.

The foregoing will be further explained with reference to FIG. 6. As explained above, when the engine output torque TE begins to decrease at the time point where the detected speed difference dN (value indirectly indicating engine speed NE) becomes smaller than the threshold value dN3 (predetermined rpm) and thereafter becomes smaller than the succeeding threshold value dN4, the hydraulic pressure supplied to the hydraulic clutch 12 is upwardly controlled to the line pressure (line pressure equivalent value) while continuing marked reduction of the engine output torque TE.

Thus, the motor 14, hydraulic clutch 12 and engine 10 are coordinately controlled in synchronism with the decline in the detected speed difference (rise in engine speed NE). In other words, the characteristics or nature of the control applied to the motor 14, hydraulic clutch 12 and engine 10 are changed with reference to the result of comparing a single parameter (speed difference dN) with common threshold values dNn (dN 1, 2, 3, 4 and 5).

This can be seen in the time chart of FIG. 6 from the fact that, on the one hand, the the motor output torque is monotonously increased to absorb the inertia associated with starting of the engine 10 until dN becomes smaller than dN2 while, on the other hand, the hydraulic pressure supplied to the clutch is rapidly increased until dN becomes smaller than dN1 that is set near dN2.

Next, assuming that the absorption of engine inertia is completed when dN becomes smaller than dN2, the motor output torque TM is monotonously increased at a more gradual rate until dN becomes smaller than dN5. When dN approaches the motor speed NM, the ignition timing of the engine 10 is slightly retarded at the time point where dN becomed smaller than dN3. Then, when dN becomes smaller than dN4, the ignition timing is retarded by the predetermined amount to markedly reduce the engine output torque TE. In parallel, the hydraulic pressure supplied to the clutch is sharply increased to the line pressure equivalent value so as to fully engage the hydraulic clutch 12. As the engagement of the clutch eliminates the need for motor output torque, it is sharply reduced to tm0, a value near zero, and thereafter gradually reduced to zero. As the ignition timing no longer needs to be retarded, it is advanced.

As can be seen from the time chart of FIG. 6, this configuration makes it possible to smooth the characteristic of motor output torque TM and minimize fluctuation of the drive shaft torque Tds. As a result, shock at the time of engagement of the hydraulic clutch 12 can be reduced and the load on the hydraulic clutch 12 lowered, with no need to estimate the output torque TE of the engine 10.

Figure 15:
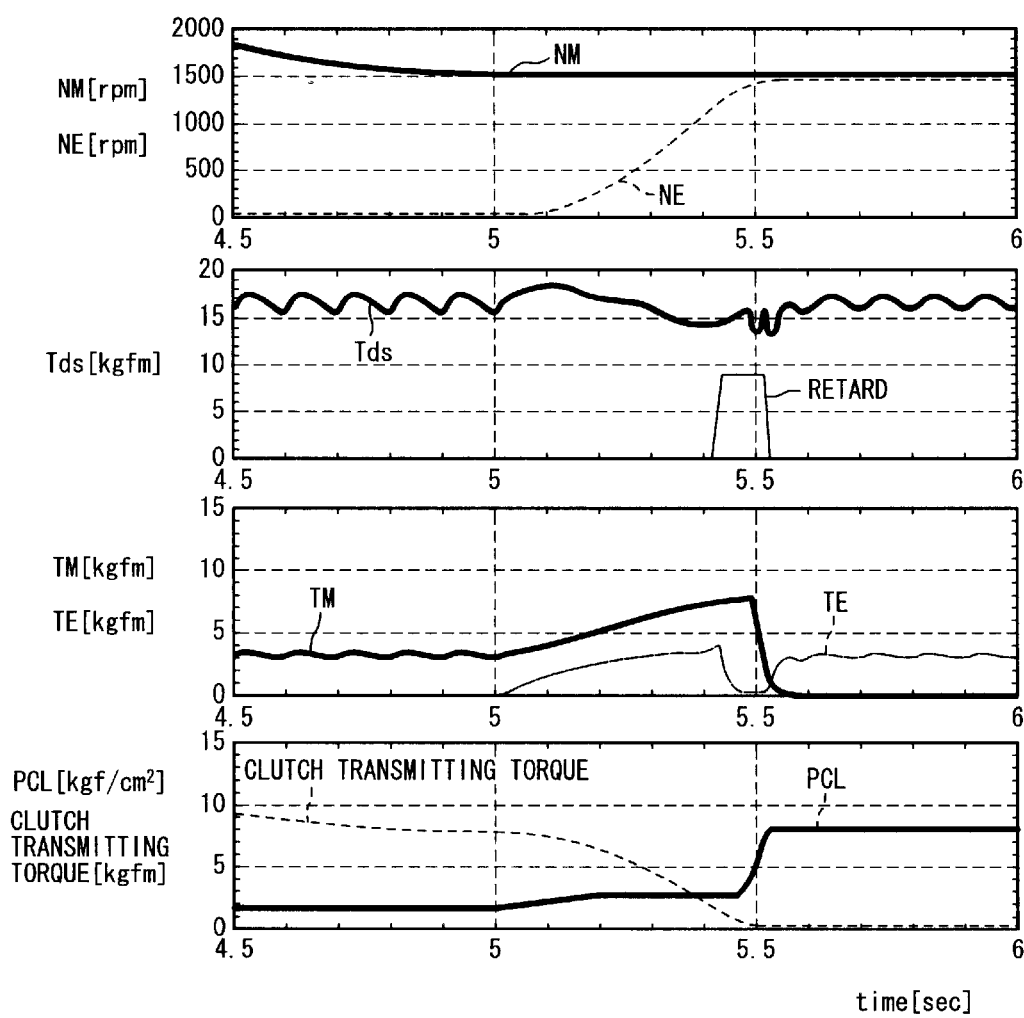
FIG. 15 is a set of time charts showing simulation results regarding the control (operation) of the system referred to in the flow chart of FIG. 3.
Figure 16:
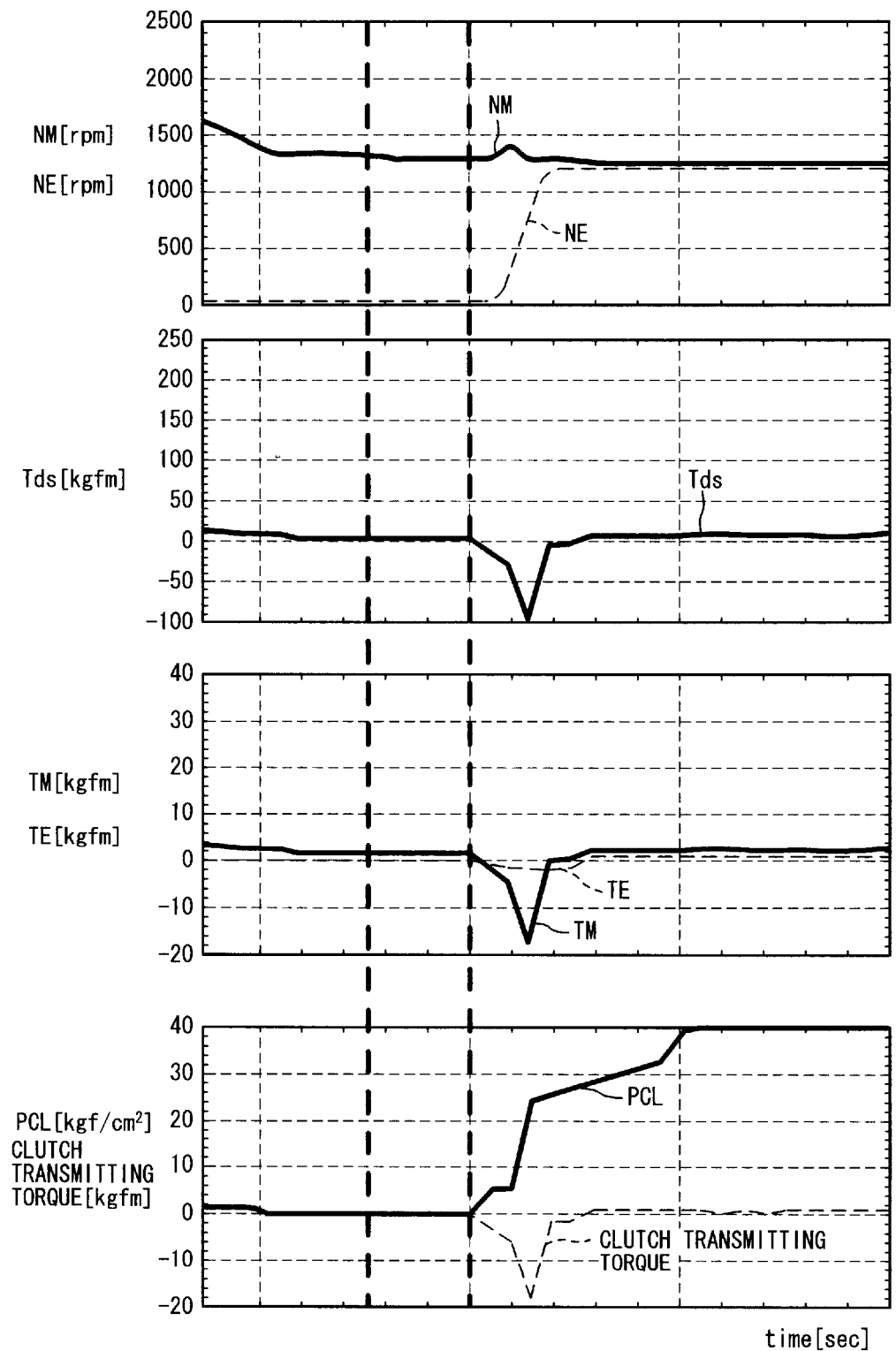
FIG. 16 is a set of time charts showing simulation results in the case of not conducting the control (operation) of the system referred to in the flow chart of FIG. 3.

FIG. 15 is a set of time charts showing simulation results regarding the control (operation) of the control system for hybrid vehicle according to this embodiment, and FIG. 16 is a set of time charts showing simulation results in the case of not conducting the control.

As is clearly seen from a comparison of FIGS. 15 and 16, the variation in drive shaft torque Tds of around 100 kgfm in the case of FIG. 16 fell to around 5 kgfm in the system according to this embodiment.

Moreover, the drop in clutch transmission torque and motor output torque TM seen in FIG. 16 does not arise in FIG. 15 and the load on the hydraulic clutch 12 is lowered by reducing output shaft torque fluctuation.

Figure 17:
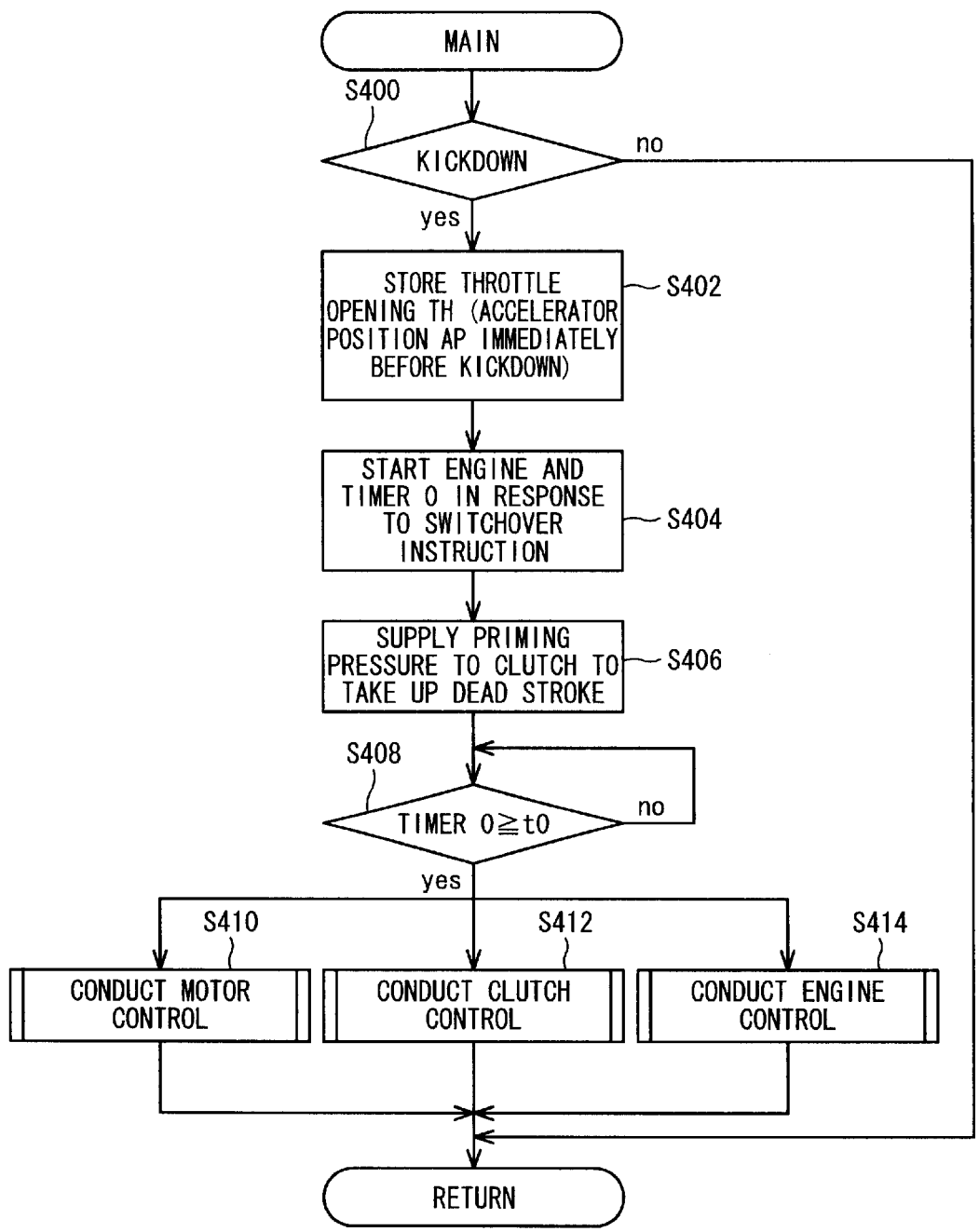
FIG. 17 is a flow chart showing the operation of the control system for hybrid vehicle according to a second embodiment of the present invention.

FIG. 17 is a flow chart, similar to FIG. 3, but showing the operation of the control system for hybrid vehicle according to a second embodiment of the present invention.

The second embodiment is extremely similar to the first embodiment and also relates to the case in which in the course of vehicle driving powered by the motor 14 when the instruction to switch to driving powered by the engine 10 occurs in response the driver's having indicated the intention to accelerate by depressing the accelerator pedal indicating the power-on-downshifting (kickdown or KD).

Figure 18:
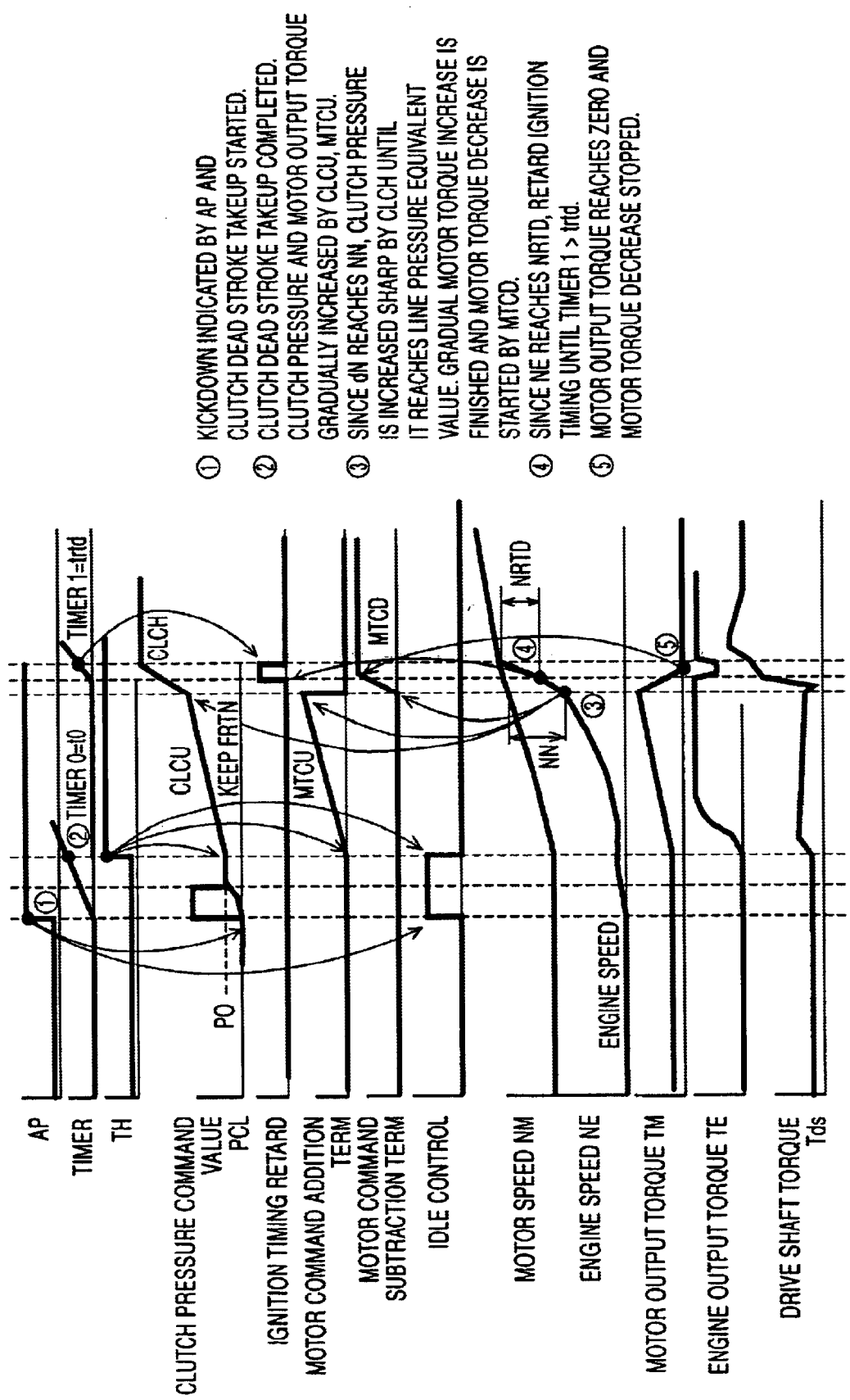
FIG. 18 is a view, similar to FIG. 6, but showing the operation of the system according to the second embodiment.

Explaining the operation of the system of the second embodiment with reference to the flow chart of FIG. 17 and a time chart of FIG. 18, the program begins in S400 in which it is determined whether the KD (kickdown, i.e., the power-on downshifting) is made, in other words, whether the driver indicates the intention to accelerate. This determination is made in the same manner as was described in S10 of the flow chart of FIG. 3 in the first embodiment. When the result is NO, the program is immediately terminated.

On the other hand, when the result is YES, the program proceeds to S402 in which a throttle opening (position) TH corresponding to the accelerator pedal position AP at that instant is stored in memory of the controller 50. Since the accelerator pedal is not mechanically linked with the throttle valve and the throttle valve is operated through the pulse motor in response to the position of the accelerator pedal in the Drive By Wire fashion, the opening or position of the throttle value corresponding to the position (depression amount) of the accelerator pedal at that instant is stored in memory.

The program next proceeds to S404 in which the decision to start the engine 10 is made in response to the aforesaid switchover instruction and the timer 0 is started for measuring or clocking elapsed time.

Next, in S406, the hydraulic clutch 12 is supplied with priming pressure (hydraulic pressure supply) in the same manner as in S12 of the flow chart of FIG. 3 in the first embodiment and in S408, the program waits until the value of the timer 0 exceeds the predetermined time period t0. When passage of the predetermined time period t0 is confirmed in S408, it is determined that the engine 10 has started with assistance from the motor 14, and control of the motor 14, hydraulic clutch 12 and engine 10 is respectively conducted in S410, S412 and S414.

Figure 19:
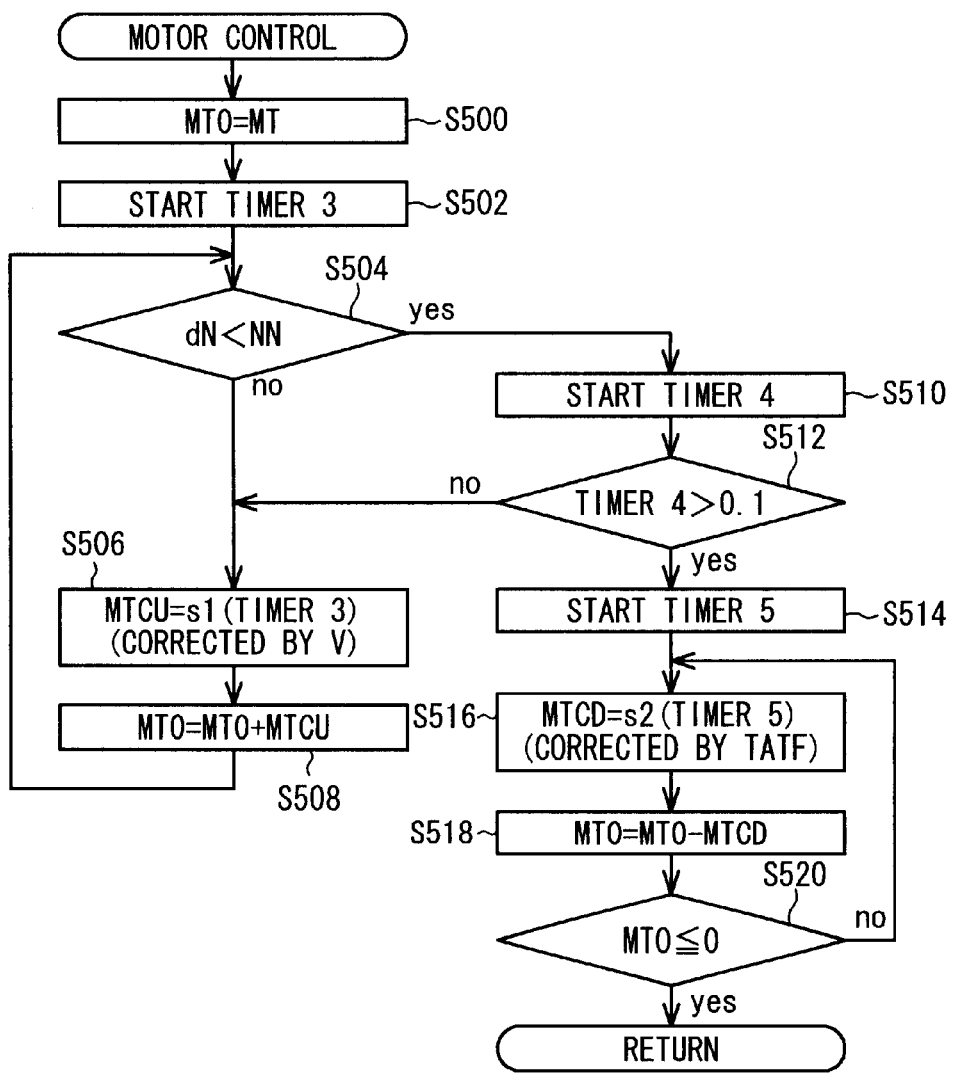
FIG. 19 is a subroutine flow chart showing the operation for controlling the motor referred to in the flow chart of FIG. 17 in the second embodiment.

FIG. 19 is a subroutine flow chart showing the operation for controlling the motor 14.

Figure 21:
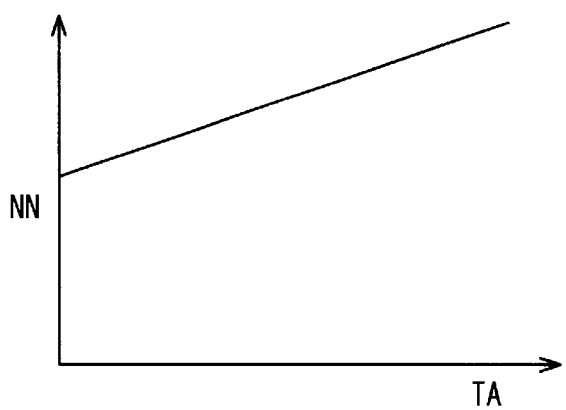
FIG. 21 is a graph showing the characteristic of the threshold value NN set relative to the intake air temperature TA and referred to in the flow chart of FIG. 19.

Moreover, as illustrated in FIG. 21, the seventh threshold value NN is also prepared beforehand as mapped data to be retrieved by the intake air temperature TA. As illustrated, the threshold value NN is set to be increased with increasing temperature TA, since the rate of engine speed rise increases as the intake air temperature TA increases.

The program begins in S500 in which the applied current command value MT corresponding to the current torque of the motor 14 is similarly defined as motor torque command value MT0.

Figure 20:
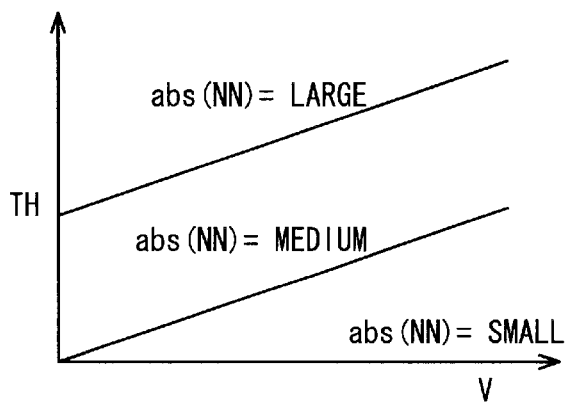
FIG. 20 is a graph showing the characteristic of a threshold value NN set relative to the vehicle speed V and the throttle opening TH and referred to in the flow chart of FIG. 19.

The program then proceeds in S502 in which a timer 3 (up-counter) is started to measure elapsed time and the program proceeds to S504 in which it is determined whether the speed difference dN is less than a seventh threshold value NN (shown in FIG. 18, e.g., 800 rpm). The seventh threshold value NN is prepared beforehand as mapped data, as shown in FIG. 20, to be retrieved by the vehicle speed V and the throttle opening TH. To be more specific, the seventh threshold value NN is set beforehand to be three values that are different in absolute value (illustrated as "abs" in the figure). The illustrated is an example and they may be increased to more than three or decreased to be less than three.

Moreover, as illustrated in FIG. 21, the seventh threshold value NN is also prepared beforehand as mapped data to be retrieved by the intake air temperature TA. As illustrated, the threshold value NN is set to be increased with increasing temperature TA, since the rate of engine speed rise increases as the intake air temperature TA increases.

Thus, in S104, the speed difference dN is compared with the seventh threshold value NN that is determined by retrieving the two kinds of mapped data by the vehicle speed V, the throttle opening TH and the intake air temperature TA.

Figure 22:
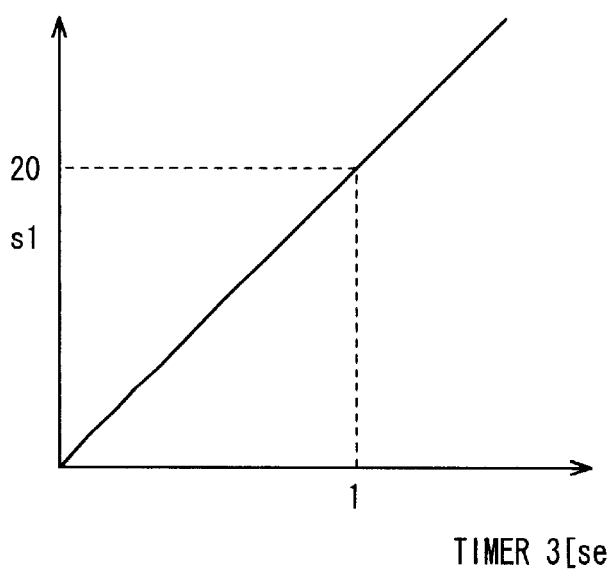
FIG. 22 is a graph showing the characteristic of a value s1 referred to in the flow chart of FIG. 19.

When the result in S504 is NO, the program proceeds to S506 in which a value s1 is retrieved from a table (whose characteristic is shown in FIG. 22) using the value of timer 3 as address data. The characteristic of table is prepared beforehand in such a way that, as illustrated in the figure, the output of s1 is 20 times of the input of timer 3. The output is converted into an addition term MTCU for the motor torque command value in an appropriate manner that is then corrected by the vehicle speed V (at the time when the intention to accelerate is indicated).

Figure 23:
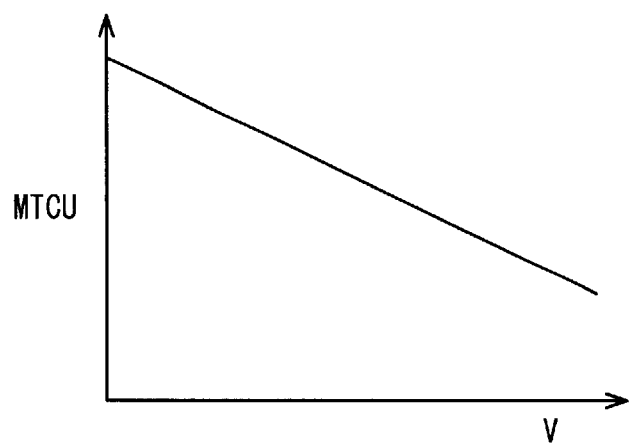
FIG. 23 is a graph showing the characteristic of an addition term MTCU set relative to the vehicle speed V and referred to in the flow chart of FIG. 19.

Specifically, as shown in FIG. 23, the addition term MTCU is downwardly corrected (decreased) as the vehicle speed V (at the time when the intention to accelerate is indicated) increases. This is done for coordinating with the clutch pressure control. Since the shift time period becomes long as the vehicle speed V increases, the time to control the supply of hydraulic pressure to the clutch increases and hence, the amount of pulling-in torque increases. For that reason, the addition term is decreased with increasing vehicle speed such that the amount to compensate for the engine inertia is decreased as the vehicle speed increases and hence the clutch pressure control time increases.

In the flow chart of FIG. 19, the program proceeds to S508 in which the motor torque command value MT0 is upwardly corrected (increased) by adding the addition term MTCU, and then returns to S504 to repeat the processing until the result in S504 becomes YES. In other words, as shown in the time chart of FIG. 18, the motor output torque is increased at a fixed rate until dN becomes less than NN.

When the result in S504 becomes YES, the program proceeds to S510 in which a timer 4 (up-counter) is started to measure elapsed time and proceeds to S512 in which it is determined whether the measured time exceeds 0.1 [sec]. When the result is NO, the program proceeds to S506. As shown in the time chart of FIG. 18, the motor output torque TM gradually increases until the speed difference dN becomes smaller than the seventh threshold value NN and is then controlled in the downward direction. Since, however, if the motor output torque TM is decreased immediately after dN becomes smaller than NN, the torque may change abruptly, the motor output torque decrease is waited for a predetermined time (i.e., 0.1 [sec]).

Figure 24:
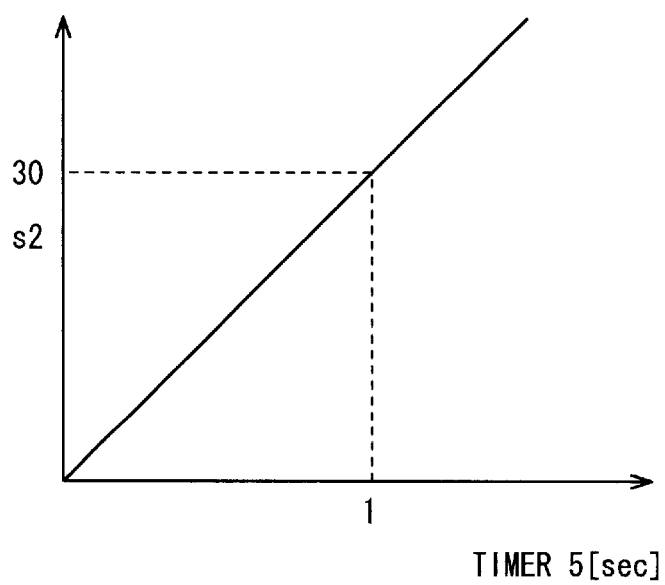
FIG. 24 is a graph showing the characteristic of a value s2 referred to in the flow chart of FIG. 19.

When the result in S512 is YES, the program proceeds to S514 in which a timer 5 (up-counter) is started to measure elapsed time and proceeds to S516 in which a value s2 is retrieved from a table (whose characteristic is shown in FIG. 24) using the value of timer 5 as address data. The characteristic of table is prepared beforehand in such a way that, as illustrated in the figure, the output of s2 is 30 times of the input of timer 5. The output is converted into a subtraction term MTCD for the motor torque command value in an appropriate manner that is then corrected by the operating fluid (ATF) temperature TATF.

Figure 25:
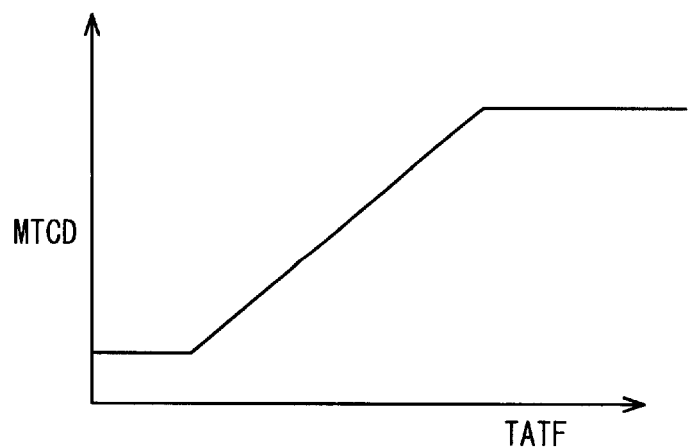
FIG. 25 is a graph showing the characteristic of a subtraction term MTCD set relative to the temperature TATF of the operating fluid (ATF) and referred to in the flow chart of FIG. 19.

Specifically, as shown in FIG. 25, the subtraction term MTCD is corrected to be be increased as the operating fluid (ATF) temperature TATF increases. Since the viscosity of operating fluid (ATF) becomes low and the response of clutch pressure control is improved as its temperature TATF increases, the subtraction term is thus corrected taking this characteristic into account in order to coordinate with the clutch pressure control.

The program then proceeds to S518 in which the motor torque command value MT0 is downwardly corrected (decreased) by subtracting the subtraction term MTCD and to S520 in which it is determined whether the motor torque command value MT0 is less than or equal to zero. When the result is YES, the subroutine program is immediately terminated. When the result is NO, on the other hand, the program returns to S516 to repeat processing until the result in S520 becomes YES.

Thus, as shown in the time chart of FIG. 18, the motor output torque TM is increased at a fixed rate until the speed difference dN becomes less than the threshold NN and after it does, upon confirmation of passage of the predetermined period of time, the motor output torque TM is decreased until it has reached zero at a rate which is greater than that of increase.

The clutch control will now be explained.

Figure 26:
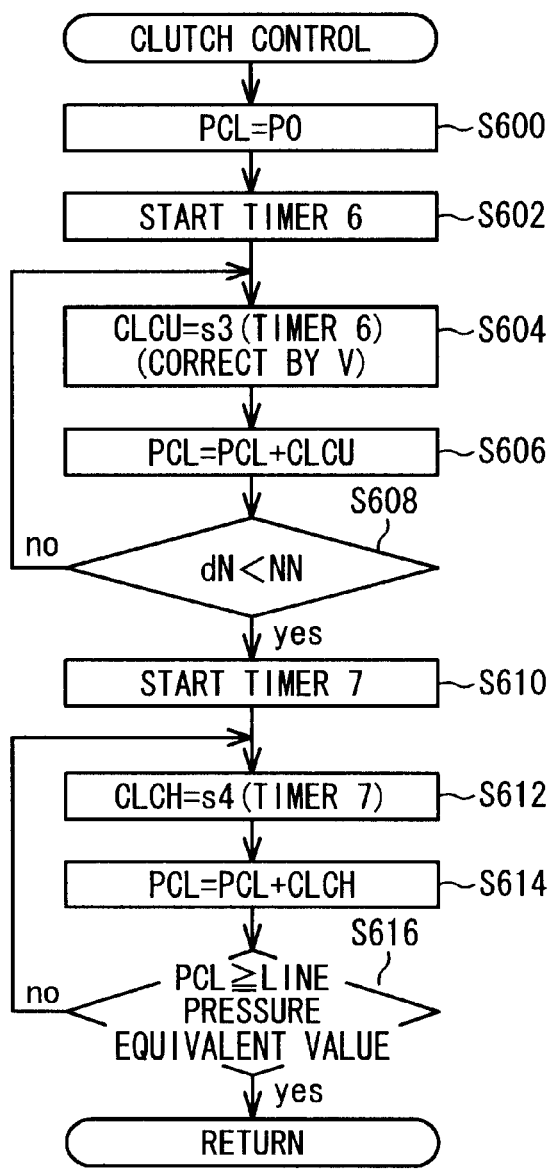
FIG. 26 is a view, similar to FIG. 12, but showing the operation for controlling the hydraulic clutch referred to in the flow chart of FIG. 17.

FIG. 26 is a subroutine flow chart showing the operation for controlling the hydraulic clutch 12. At the time the subroutine of FIG. 26 is activated, the hydraulic clutch 12 has already been supplied with priming pressure by the operation conducted in S406 of the flow chart of FIG. 17 explained earlier.

The program begins in S600 in which the clutch pressure command value PCL is defined as the value P0 in the manner as the first embodiment and proceeds to S502 in which a timer 6 (up-counter) is started to measure elapsed time.

Figure 27:
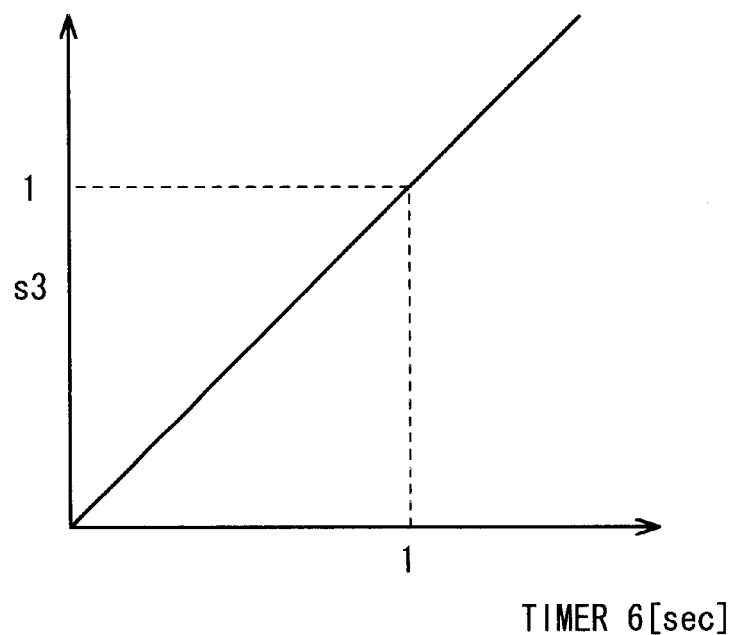
FIG. 27 is a graph showing the characteristic of a value s3 referred to in the flow chart of FIG. 26.

The program then proceeds to S604 in which a value s3 is retrieved from a table (whose characteristic is shown in FIG. 27) using the value of timer 6 as address data. The characteristic of table is prepared beforehand in such a way that, as illustrated in the figure, the output of s3 is 1 time of the input of timer 6, in other words, the output is immediately corresponding to the input. The output is converted into an addition term CLCU for the clutch pressure command value in an appropriate manner that is then corrected by the vehicle speed V (at the time when the intention to accelerate is indicated).

Figure 28:
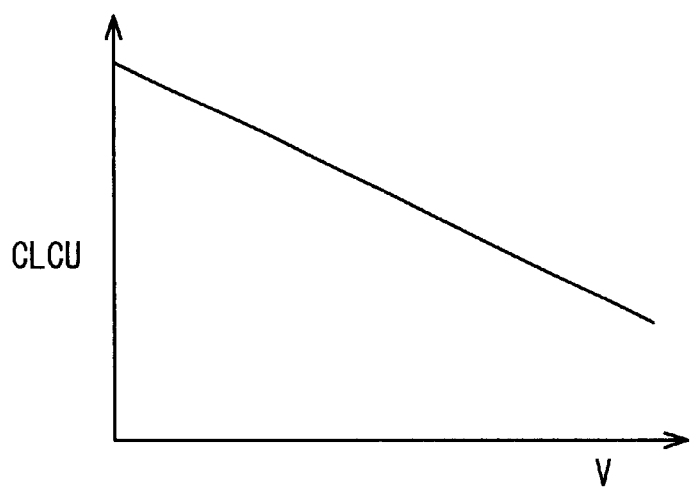
FIG. 28 is a graph showing the characteristic of an addition term CLCU set relative to the vehicle speed V and referred to in the flow chart of FIG. 26.

Specifically, as shown in FIG. 28, the addition term CLCU is downwardly corrected as the vehicle speed V (at the time when the intention to accelerate is indicated) increases. As mentioned above with reference to FIG. 23, since the shift time period becomes long as the vehicle speed V increases, the time to control the supply of hydraulic pressure to the clutch increases and hence, the amount of pulling-in torque increases. Accordingly, as the vehicle speed increases and hence the clutch pressure control time increases, the addition term is decreased with increasing vehicle speed such that the rate of clutch pressure increase is reduced to make the amount of pulling-in torque smaller.

In the flow chart of FIG. 26, the program proceeds to S606 in which the addition term CLCU is added to the clutch pressure command value PCL to increase the same and to S608 in which it is again determined whether the speed difference dN is less than the aforesaid threshold value NN. When the result is NO, the program returns to S604 to repeat the processing until the result in S608 becomes YES.

Figure 29:
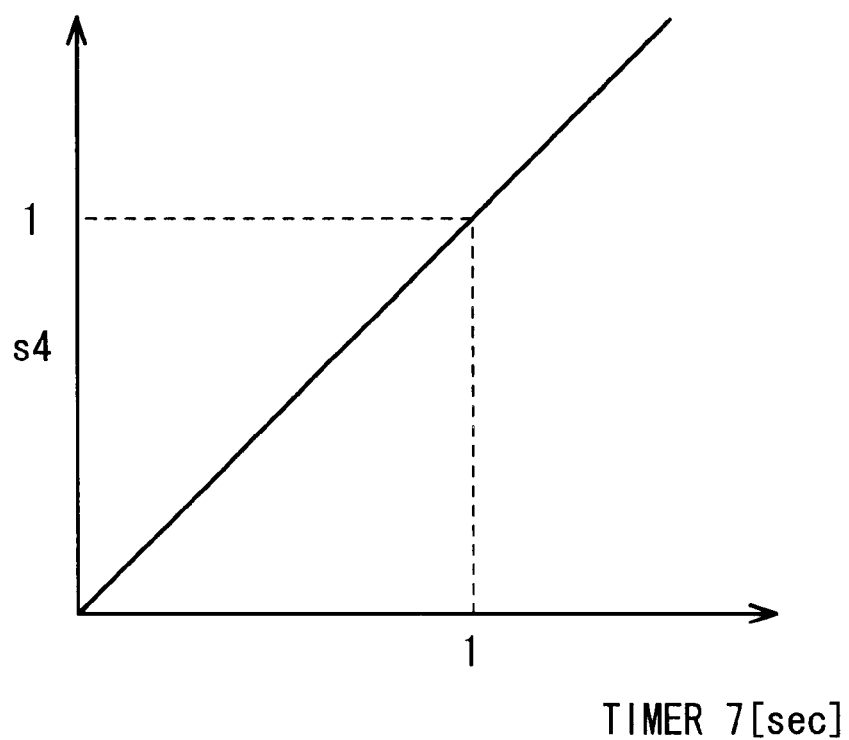
FIG. 29 is a graph showing the characteristic of a value s4 referred to in the flow chart of FIG. 26.

When the result in S608 becomes YES, the program proceeds to S610 in which a timer 7 (up-counter) is started to measure elapsed time and to S612 in which a value s4 is retrieved from a table (whose characteristic is shown in FIG. 29) using the value of timer 7 as address data. The characteristic of table is prepared beforehand in such a way that the output is also corresponding to the input. The output is then converted into a second addition term CLCH for the clutch pressure command value in an appropriate manner. The program then proceeds to S614 in which the second addition term CLCH is added to the clutch pressure command value PCL to increase the same.

Here, the second addition term CLCH is set to be greater than the addition term CLCU (even at its maximum) such that, the clutch pressure is gradually increased at a relatively small fixed rate (similar to that of the motor output torque control) until the speed difference dN exceeds the threshold value NN and when dN exceeds NN, the clutch pressure is increased at a greater fixed rate.

The program then proceeds to S616 in which it is determined whether the clutch pressure command value PCL is greater than or equal to the value corresponding to the line pressure (shown in FIG. 18) and when the result is NO, the program returns to S612 in which the clutch pressure command value PCL is added by the second addition term CLCH to increase the same. When the result in S616 becomes YES, the subroutine program is terminated.

Thus, in the control according to the second embodiment, upward control of the hydraulic pressure supplied to the hydraulic clutch 12 (clutch pressure command value PCL) and upward/downward control of the output torque of the motor 14 (motor torque command value MTO) are also conducted synchronously with decrease in the detected speed difference (in other words, rise in engine speed NE). More specifically, the detected speed difference dN is compared with the threshold value NN and the supply of hydraulic pressure to the clutch 12 (clutch pressure command value PCL) is upwardly controlled.

The engine control will now be explained.

Figure 30:
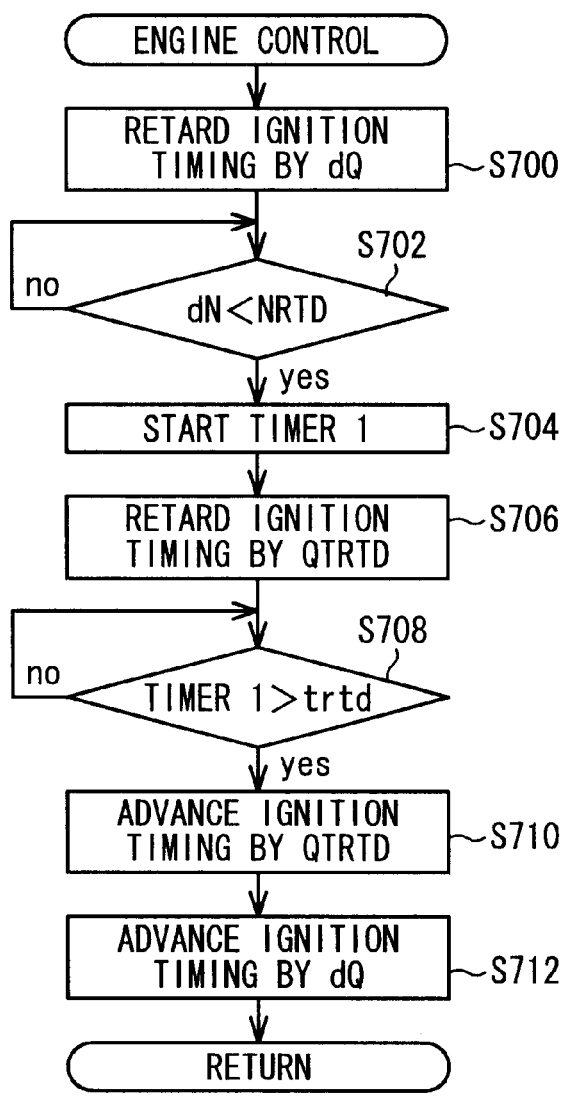
FIG. 30 is a graph, similar to FIG. 13, but showing the operation for controlling the engine referred to in the flow chart of FIG. 17.

FIG. 30 is subroutine flow chart showing the operation for controlling the engine 10.

Like the first embodiment, although omitted from the drawings, the engine 10 is cranked and started by rotation transmitted from the motor 14 immediately after the dead stroke of the hydraulic clutch 12 has been taken up by supply of priming pressure. Upon being started, the engine 10 is controlled to raise the speed to a level at which the engine generates output corresponding to the throttle opening TH that corresponds to the accelerator position AP at the time when the driver indicates the instruction to accelerate.

The program begins in S700 in which the ignition timing is retarded by the small amount (small crank angular value) dQ so as to temporarily reduce the output torque of the engine 10.

The program then proceeds to S702 in which it is determined whether the speed difference dN is less than an eighth threshold value NRTD (e.g., 30 rpm, set to be close to the motor speed NM). When the result is YES, the program proceeds to S704 in which the aforesaid timer 1 is started to measure elapsed time, and to S708 in which the ignition timing is retarded by the predetermined large amount (crank angles) QTRTD.

Figure 31:
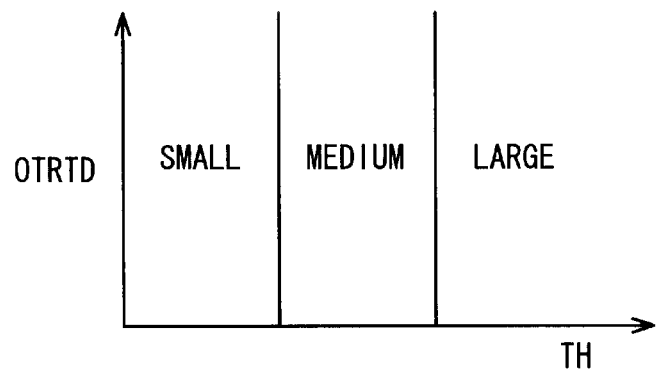
FIG. 31 is a graph showing the amount of ignition timing retardation QTRTD referred to in the flow chart of FIG. 30.

As shown in FIG. 31, in the system according to the second embodiment, the amount QTRTD comprises three values in such a way that the amount increases with increasing throttle opening TH. This is because the engine output reduction should be increased as the throttle opening TH increases.

Figure 32:
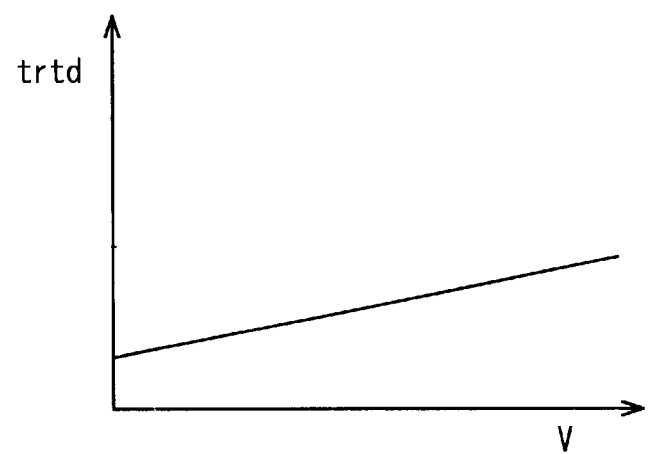
FIG. 32 is a graph showing the period of time for the ignition timing retardation trtd referred to in the flow chart of FIG. 30.
Figure 33:
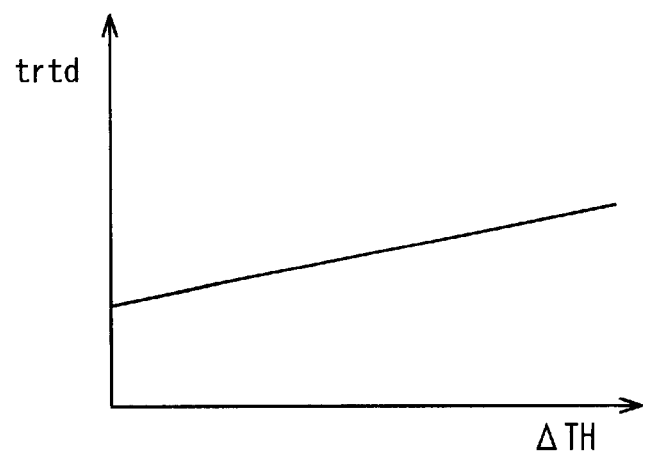
FIG. 33 is a graph similarly showing the period of time for the ignition timing retardation trtd referred to in the flow chart of FIG. 30.

The program then proceeds to S708 in which it is checked whether the value of the timer 1 has exceeded the predetermined value (time) trtd. As shown in FIG. 32, in the system according to the second embodiment, the value trtd is set to be increased with increasing vehicle speed V (at the time when the instruction to accelerate is indicated). At the same time, the value trtd is also set to be increased with increasing a throttle opening change ΔTH (that is a change of throttle opening TH per unit time). A crank angular value may be used in place of time trtd.

When the result in S708 becomes YES, the program proceeds to S710 in which the ignition timing is returned in the advance direction by an amount equal to the retard amount QTRTD, and then to S712 in which the ignition timing is returned in the advance direction by the amount equal to the small amount dQ, whereafter the subroutine program is terminated.

Thus, similar to the control according to the first embodiment, in the control according to the second embodiment, the motor 14, hydraulic clutch 12 and engine 10 are also coordinately controlled in synchronism with the decline in the detected speed difference (rise in engine speed NE). In other words, the characteristics or nature of the control applied to the motor 14, hydraulic clutch 12 and engine 10 are changed with reference to the result of comparing the single parameter (speed difference dN) with common threshold values NN and NRTD.

With this, as illustrated in the time chart of FIG. 18, the motor output torque TM and the clutch pressure command value PCL are increased at the similar rates to absorb the inertia associated with starting of the engine 10 until dN becomes smaller than NN. Then, when dN becomes smaller than NRTD (which is set to be close to the motor speed NM), the ignition timing is retarded to reduce the engine output torque TE, while the hydraulic pressure supplied to the clutch 12 is sharply increased to the line pressure equivalent value so as to fully engage the hydraulic clutch 12. As the engagement of the clutch eliminates the need for motor output torque, it is sharply reduced and the ignition is advanced.

As can be seen from the time chart of FIG. 18, under the power-on-downshifting indicated by the instruction to accelerate, the configuration of the second embodiment also makes it possible to smooth the characteristic of motor output torque TM and minimize fluctuation of the drive shaft torque Tds. With this, shock at the time of engagement of the hydraulic clutch 12 can be reduced and the load on the hydraulic clutch 12 lowered, with no need to estimate the output torque TE of the engine 10.

Figure 34:
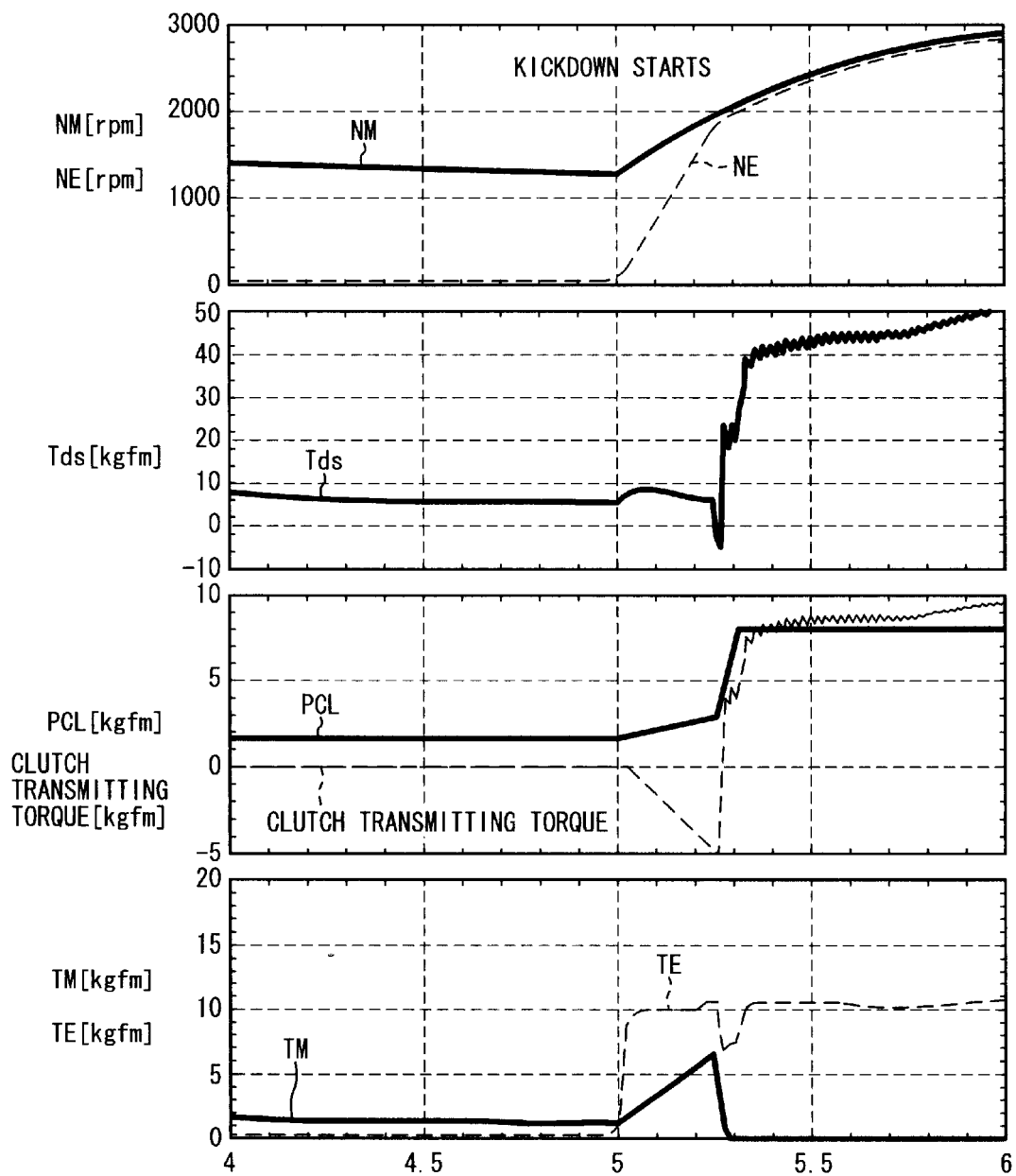
FIG. 34 is a set of time charts showing simulation results regarding the control (operation) of the system referred to in the flow chart of FIG. 17.
Figure 35:
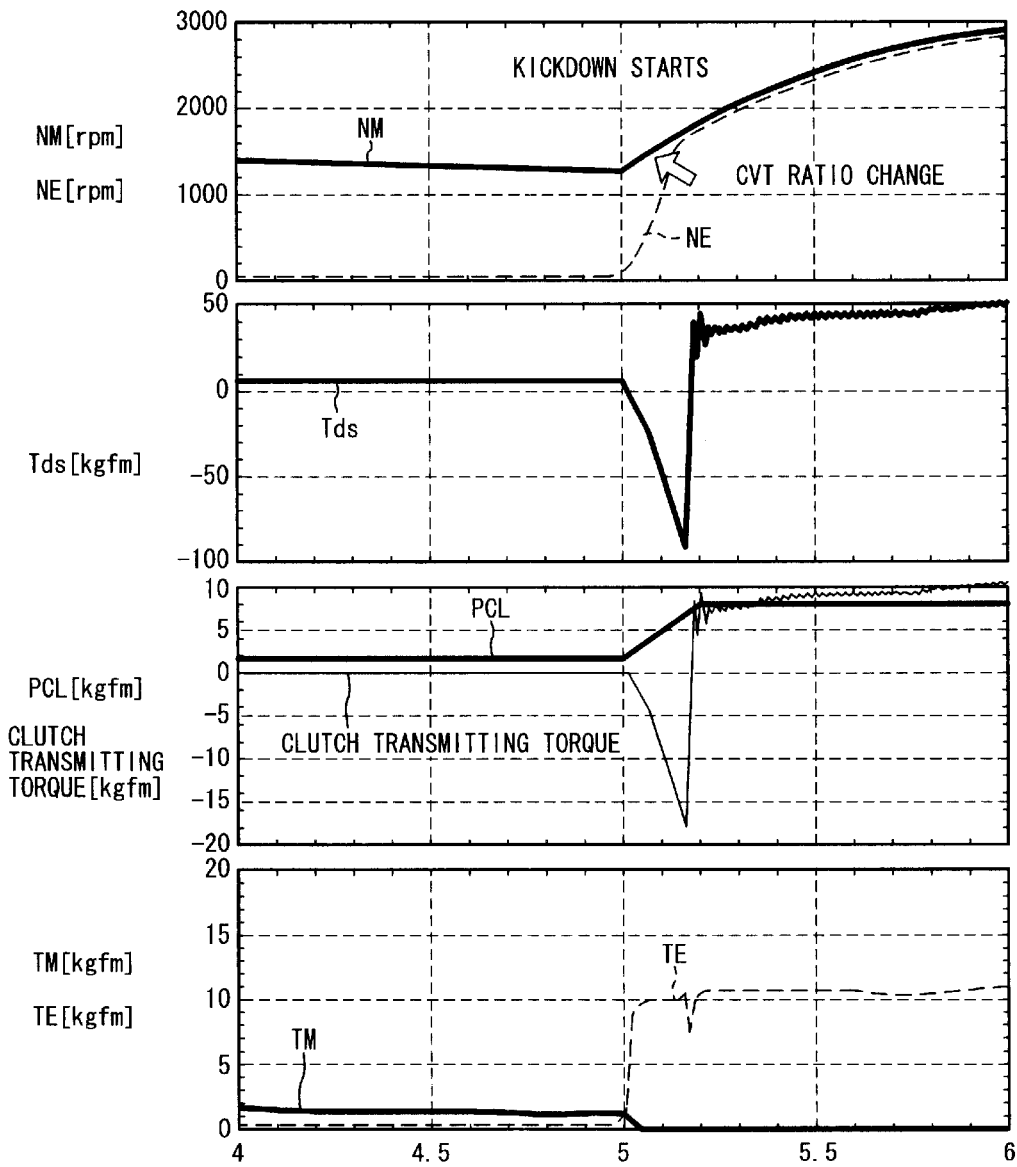
FIG. 35 is a set of time charts showing simulation results in the case of not conducting the control (operation) of the system referred to in the flow chart of FIG. 17.

FIG. 34 is a set of time charts showing simulation results regarding the control (operation) of the control system for hybrid vehicle according to this embodiment, and FIG. 35 is a set of time charts showing simulation results in the case of not conducting the control. As is clearly seen from a comparison of FIGS. 34 and 35, the variation in drive shaft torque Tds of around 100 kgfm in the case of FIG. 35 fell to around 10 kgfm in the system according to the second embodiment. Such a slight and instantaneous drive shaft torque drop does not impart a shock to the passengers. Moreover, the drop in clutch transmission torque and motor output torque TM seen in FIG. 16 does not arise in FIG. 34, and the load on the hydraulic clutch 12 is lowered by reducing output shaft torque fluctuation.

As mentioned above, the first and second embodiments are thus configured to have a system for controlling a hybrid vehicle equipped with an internal combustion engine (10), an electric motor (14) connected to an output shaft (10a) of the engine through a hydraulic clutch (12) and an automatic transmission (16) connected to an output shaft (14b) of the motor to be inputted with an output torque outputted from at least one of the engine and the motor to transmit the output torque to driven wheels (24) of the vehicle, comprising: initial control conducting means (50, S10–S14, S400–S406) for conducting an initial control to supply priming hydraulic pressure to the clutch to take up dead stroke and to start the engine, when an instruction to switch to vehicle driving powered by the engine is made in a course of driving powered by the motor; speed difference determining means (26, 28, 50) for determining a speed difference (dN) between speeds of the motor (NM) and the engine (NE); increase control conducting means (50, S16–S18, S100–S108, S200–S208, S408–S412, S500–S516, S600–S614) for conducting an increase control to increase the output torque of the motor (TM) and to increase supply of hydraulic pressure to the clutch (PCL) based on the determined speed difference, when the engine is started; and synchronous control conducting means (50, S20, S300–S314, S700–S712) for conducting a synchronous control to reduce the output torque of the engine for a predetermined period of time (QTRTD) such that the engine speed (NE) is synchronized with the motor speed (NM) when the speed difference (dN) becomes less than a predetermined threshold value (dN3, NN).

With this, coordinated control of the motor, hydraulic clutch and engine is conducted concurrently with rise of the detected engine speed and the hydraulic clutch is engaged while reducing the engine output torque. Fluctuation of drive shaft torque can therefore be minimized without having to estimate the engine output torque. As a result, shock arising at the time the hydraulic clutch engages can be reduced and the load on the hydraulic clutch lowered.

In the system, the synchronous control means begins to increase the supply of hydraulic pressure (PCL) to a line pressure equivalent value, while beginning to decrease the output toque of motor (TM) when the speed difference (dN) becomes less than the predetermined value (dN3, NN).

In the system, the synchronous control means begins to increase the supply of hydraulic pressure (PCL) to the line pressure equivalent value, while beginning to decrease the output toque of motor (TM) when the speed difference (dN) becomes less than a predetermined second threshold value (NRTD) which is set to be less than the predetermined threshold value (NN).

In the system, the synchronous control means conducts the synchronous control to reduce the output torque of the engine when the speed difference (dN) becomes less than a predetermined second threshold value (dN4, NRTD) which is set to be less than the predetermined threshold value (dN3, NN).

In the system, the predetermined threshold value (NN) is set to relative to a vehicle speed (V) and a throttle opening (TH).

In the system, the predetermined threshold value (NN) is set to relative to a temperature of operating fluid (TATF) vehicle speed V and a throttle opening TH.

In the system, the synchronous control conducting means conducts the synchronous control to reduce the output torque of the engine for the predetermined period of time (trtd) that is set to be increased with increasing vehicle speed (V).

In the system, the synchronous control conducting means conducts the synchronous control to reduce the output torque of the engine for the predetermined period of time (trtd) that is set to be increased with increasing vehicle speed and to be further increased with increasing throttle opening change ($\Delta$TH).

In particular, the first embodiment is configured to have a system for controlling a hybrid vehicle equipped with an internal combustion engine (10), an electric motor (14) connected to an output shaft (10a) of the engine through a hydraulic clutch (12) and an automatic transmission (16) connected to an output shaft (14b) of the motor to be inputted with an output torque outputted from at least one of the engine and the motor to transmit the output torque to driven wheels (24) of the vehicle, comprising initial control conducting means (50, S10–S14,) for conducting an initial control to supply priming hydraulic pressure to the clutch to take up dead stroke and to start the engine, when an instruction to switch to vehicle driving powered by the engine is made in a course of vehicle driving powered by the motor; engine speed determining means (26, 28, 50) for determining a speed (dN) of the engine; increase control conducting means (50, S16–S18, S100–S108, S200–S208) for conducting an increase control to increase the output torque of the motor and to increase supply of hydraulic pressure to the clutch in synchronized with the detected engine speed, when the engine is started; and synchronous control conducting means (S18–S20, S304–S314) for conducting a synchronous control to reduce the output torque of the engine for a predetermined period of time such that the engine speed is synchronized with the motor speed when the detected engine speed reaches a predetermined engine speed (dN4).

With this, coordinated control of the motor, hydraulic clutch and engine is conducted concurrently with rise of the detected engine speed and the hydraulic clutch is engaged while reducing the engine output torque. Fluctuation of drive shaft torque can therefore be minimized without having to estimate the engine output torque. As a result, shock arising at the time the hydraulic clutch engages can be reduced and the load on the hydraulic clutch lowered.

In the system, the increase control means conducts the increase control to increase the output torque of the motor and to increase the supply of hydraulic pressure to the clutch at rates determined by comparing the determined engine speed (dN) with a plurality of values (dNn) indicative of the engine speed.

Thus, the system is configured to successively compare the detected engine speed with a series of threshold values, upwardly control the hydraulic pressure supplied to the clutch every time the detected engine speed exceeds one of the threshold values and upwardly/downwardly control the motor output torque, i.e., is configured to control the motor, hydraulic clutch and engine with reference to the result of comparing a single parameter with common threshold values. The motor, hydraulic clutch and engine can therefore be coordinately controlled to good effect, shock occurring upon engagement of the hydraulic clutch can be still more effectively reduced with no need to estimate the engine output torque TE, and the load on the hydraulic clutch can be reduced even more effectively.

In the system, the increase control means conducts a decrease control to decrease the output torque of the motor when the detected engine speed (dN) reaches a predetermined second engine speed (dN5) which is higher than the predetermined engine speed (dN4).

In the system, the synchronous control conducting means conducts the synchronous control to reduce the output torque of the engine, while increasing the supply of hydraulic pressure to a line pressure equivalent value.

The entire disclosure of Japanese Patent Application Nos. 2001-148942 and 2001-148943 both filed on May 18, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a hybrid vehicle equipped with an internal combustion engine, an electric motor connected to an output shaft of the engine through a hydraulic clutch and an automatic transmission connected to an output shaft of the motor to be inputted with an output torque outputted from at least one of the engine and the motor to transmit the output torque to driven wheels of the vehicle, comprising:

initial control conducting means for conducting an initial control to supply priming hydraulic pressure to the clutch to take up dead stroke and to start the engine, when an instruction to switch to vehicle driving powered by the engine is made in a course of vehicle driving powered by the motor;

speed difference determining means for determining a speed difference between speeds of the motor and the engine;

increase control conducting means for conducting an increase control to increase the output torque of the motor and to increase supply of hydraulic pressure to the clutch based on the determined speed difference, when the engine is started; and synchronous control conducting means for synchronizing the engine speed and the motor speed, while reducing the output torque of the engine for a predetermined period of time when the speed difference becomes less than a predetermined threshold value.

2. A system according to claim 1, wherein the synchronous control conducting means begins to increase the supply of hydraulic pressure to a line pressure equivalent value, while beginning to decrease the output torque of the motor when the speed difference becomes less than a predetermined second threshold value.

3. A system according to claim 2, wherein the synchronous control means begins to increase the supply of hydraulic pressure to the line pressure equivalent value, while beginning to decrease the output toque of motor when the speed difference becomes less than the predetermined second threshold value which is set to be more than the predetermined threshold value.

4. A system according to claim 2, wherein the synchronous control conducting means conducts the synchronous control to reduce the output torque of the engine when the speed difference becomes less than the predetermined threshold value which is set to be less than the predetermined second threshold value.

5. A system according to claim 1, wherein the predetermined second threshold value is set relative to a vehicle speed and a throttle opening.

6. A system according to claim 1, wherein the predetermined second threshold value is set relative to an air intake temperature, vehicle speed and a throttle opening.

7. A system according to claim 1, wherein the synchronous control conducting means conducts the synchronous control to reduce the output torque of the engine for the predetermined period of time and the predetermined period of time is set to be increased with increasing vehicle speed.

8. A system according to claim 7, wherein the synchronous control conducting means conducts the synchronous control to reduce the output torque of the engine for the predetermined period of time and the predetermined period of time is set to be increased with increasing vehicle speed and to be further increased with increasing throttle opening change.

9. A system for controlling a hybrid vehicle equipped with an internal combustion engine, an electric motor connected to an output shaft of the engine through a hydraulic clutch and an automatic transmission connected to an output shaft of the motor to be inputted with an output torque outputted from at least one of the engine and the motor to transmit the output torque to driven wheels of the vehicle, comprising initial control conducting means for conducting an initial control to supply priming hydraulic pressure to the clutch to take up dead stroke and to start the engine, when an instruction to switch to vehicle driving powered by the engine is made in a course of vehicle driving powered by the motor;

engine speed determining means for determining a speed of the engine;

increase control conducting means for conducting an increase control to increase the output torque of the motor and to increase supply of hydraulic pressure to the clutch in synchronized with the detected engine speed, when the engine is started; and synchronous control conducting means for synchronizing the engine speed and the motor speed, while reducing the output torque of the engine for a predetermined period of time and increasing the supply of hydraulic pressure to a line pressure equivalent value when the detected engine speed reaches a predetermined engine.

10. A system according to claim 9, wherein the increase control conducting means conducts the increase control to increase the output torque of the motor and to increase the supply of hydraulic pressure to the clutch at rates determined by comparing the determined engine speed with a plurality of values indicative of the engine speed.

11. A system according to claim 10, wherein the increase control conducting means conducts a decrease control to decrease the output torque of the motor when the detected engine speed reaches a predetermined second engine speed which is higher than the predetermined engine speed.

12. A method of controlling a hybrid vehicle equipped with an internal combustion engine, an electric motor connected to an output shaft of the engine through a hydraulic clutch and an automatic transmission connected to an output shaft of the motor to be inputted with an output torque outputted from at least one of the engine and the motor to transmit the output torque to driven wheels of the vehicle, comprising the steps of:

(a) conducting an initial control to supply priming hydraulic pressure to the clutch to take up dead stroke and to start the engine, when an instruction to switch to vehicle driving powered by the engine is made in a course of vehicle driving powered by the motor;

(b) determining a speed difference between speeds of the motor and the engine;

(c) conducting an increase control to increase the output torque of the motor and to increase supply of hydraulic pressure to the clutch based on the determined speed difference, when the engine is started; and (d) synchronizing the engine speed and the motor speed, while reducing the output torque of the engine for a predetermined period of time when the speed difference becomes less than a predetermined threshold value.

13. A method according to claim 12, wherein the step (d) begins to increase the supply of hydraulic pressure to a line pressure equivalent value, while beginning to decrease the output torque of motor when the speed difference becomes less than a predetermined second threshold value.

14. A method according to claim 13, wherein the step (d) begins to increase the supply of hydraulic pressure to the line pressure equivalent value, while beginning to decrease the output torque of motor when the speed difference becomes less than the predetermined second threshold value which is set to be more than the predetermined threshold value.

15. A method according to claim 13, wherein the step (d) conducts the synchronous control to reduce the output torque of the engine when the speed difference becomes less than the predetermined second threshold value which is set to be less than the predetermined second threshold value.

16. A method according to claim 12, wherein the predetermined second threshold value is set relative to a vehicle speed and a throttle opening.

17. A method according to claim 12, wherein the predetermined second threshold value is set relative to an air intake temperature, vehicle speed and a throttle opening.

18. A method according to claim 12, wherein the step (d) conducts the synchronous control to reduce the output torque of the engine for the predetermined period of time and the predetermined period of time is set to be increased with increasing vehicle speed.

19. A method according to claim 18, wherein the step (d) conducts the synchronous control to reduce the output torque of the engine for the predetermined period of time and the predetermined period of time is set to be increased with increasing vehicle speed and to be further increased with increasing throttle opening change.

20. A method of controlling a hybrid vehicle equipped with an internal combustion engine, an electric motor connected to an output shaft of the engine through a hydraulic clutch and an automatic transmission connected to an output shaft of the motor to be inputted with an output torque outputted from at least one of the engine and the motor to transmit the output torque to driven wheels of the vehicle, comprising the steps of (a) conducting an initial control to supply priming hydraulic pressure to the clutch to take up dead stroke and to start the engine, when an instruction to switch to vehicle driving powered by the engine is made in a course of vehicle driving powered by the motor;

(b) determining a speed of the engine;

(c) conducting an increase control to increase the output torque of the motor and to increase supply of hydraulic pressure to the clutch in synchronized with the detected engine speed, when the engine is started; and (d) synchronizing the engine speed and the motor speed, while reducing the output torque of the engine for a predetermined period of time and increasing the supply of hydraulic pressure to a line pressure equivalent value when the detected engine speed reaches a predetermined engine speed.

21. A method according to claim 20, wherein the step (c) conducts the increase control to increase the output torque of the motor and to increase the supply of hydraulic pressure to the clutch at rates determined by comparing the determined engine speed with a plurality of values indicative of the engine speed.

22. A method according to claim 21, wherein the step (c) conducts a decrease control to decrease the output torque of the motor when the detected engine speed reaches a predetermined second engine speed which is higher than the predetermined engine speed.

* * * * *